United States Patent
Wada et al.

(10) Patent No.: US 7,417,718 B2
(45) Date of Patent: Aug. 26, 2008

(54) OPTICAL DISTANCE MEASURING APPARATUS

(75) Inventors: Hideo Wada, Katsuragi (JP); Nobuhisa Watanabe, Kashiba (JP); Takayuki Taminaga, Nara-ken (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/589,224

(22) Filed: Oct. 30, 2006

(65) Prior Publication Data
US 2007/0097349 A1 May 3, 2007

(30) Foreign Application Priority Data
Oct. 28, 2005 (JP) ............... P2005-313784
Nov. 11, 2005 (JP) ............... P2005-327510

(51) Int. Cl.
*G01B 3/36* (2006.01)
(52) U.S. Cl. .................................... 356/5.01
(58) Field of Classification Search ............... 356/5.01
See application file for complete search history.

(56) References Cited

U.S. PATENT DOCUMENTS 5,107,449 A * 4/1992 Ikuta ..................... 702/159
5,608,514 A * 3/1997 Stann et al. ............. 356/5.09
6,246,468 B1 * 6/2001 Dimsdale ................ 356/4.02

FOREIGN PATENT DOCUMENTS

| JP | 6-18665 | 1/1994 |
| JP | 7-294642 | 11/1995 |
| JP | 2004-294420 | 10/2004 |

OTHER PUBLICATIONS

Miyagawa et al., "CCD-Based Range-Finding Sensor", IEEE Transactions on Electron Devices, vol. 44(10), pp. 1648-1652 (1997).

* cited by examiner

*Primary Examiner*—Thomas H. Tarcza
*Assistant Examiner*—Luke D Ratcliffe
(74) *Attorney, Agent, or Firm*—Nixon & Vanderhye P.C.

(57) ABSTRACT

In an optical distance measuring apparatus, a transmitter has a light-emitting device emitting an optical signal synchronized with a modulating signal having a predetermined repetition frequency, and a modulating signal generator outputting the modulating signal to the light-emitting device. A receiver has a photodetector receiving an optical beam reflected by an object to be measured and converting it to an electrical signal, a switch receiving the signal from the modulating signal generator and alternately choosing two channels for the electrical signal with a predetermined timing, and first and second storage sections storing electrical signals on the two channels. A signal processing section has a differential operation section performing a differential operation on electrical signals stored in the first and second storage sections, and a distance determining section determining a distance to the object on the basis of the result of the differential operation of the differential operation section.

33 Claims, 19 Drawing Sheets

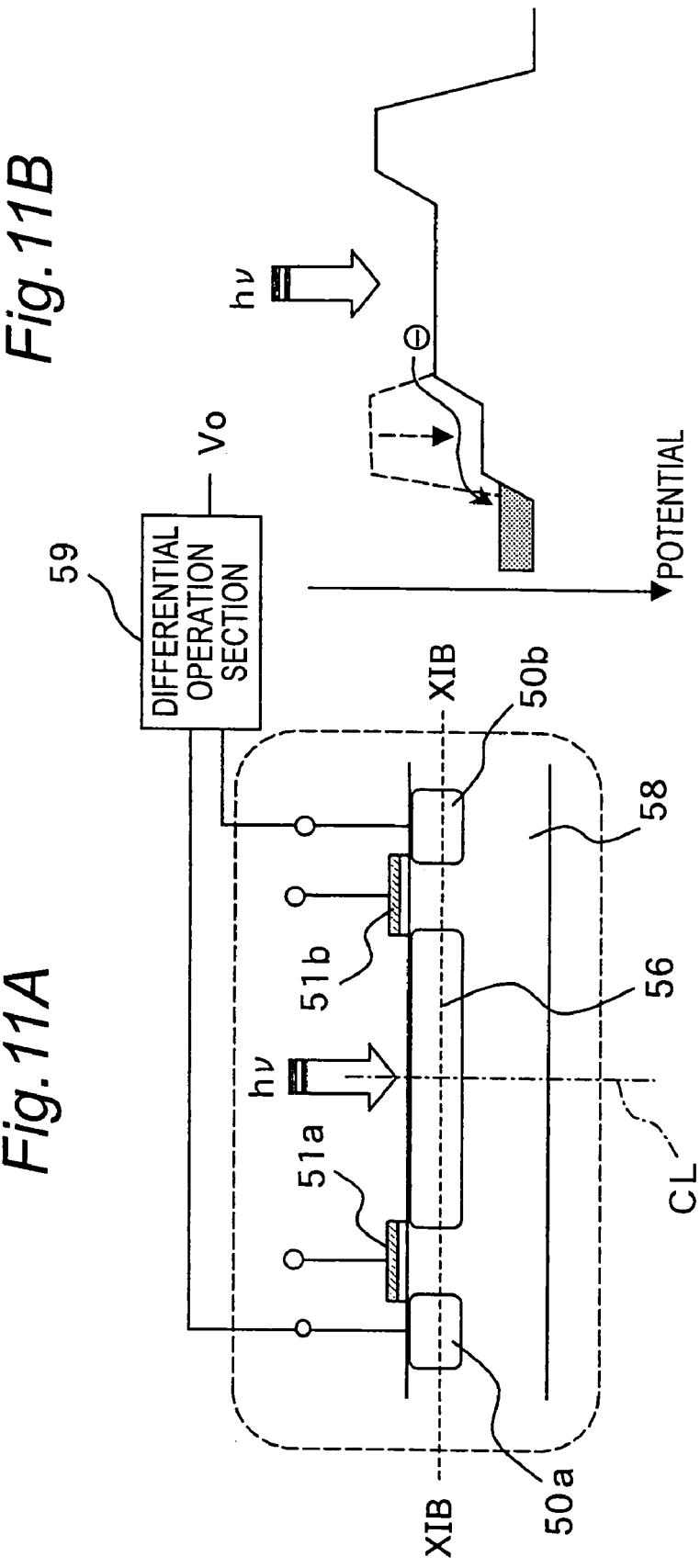

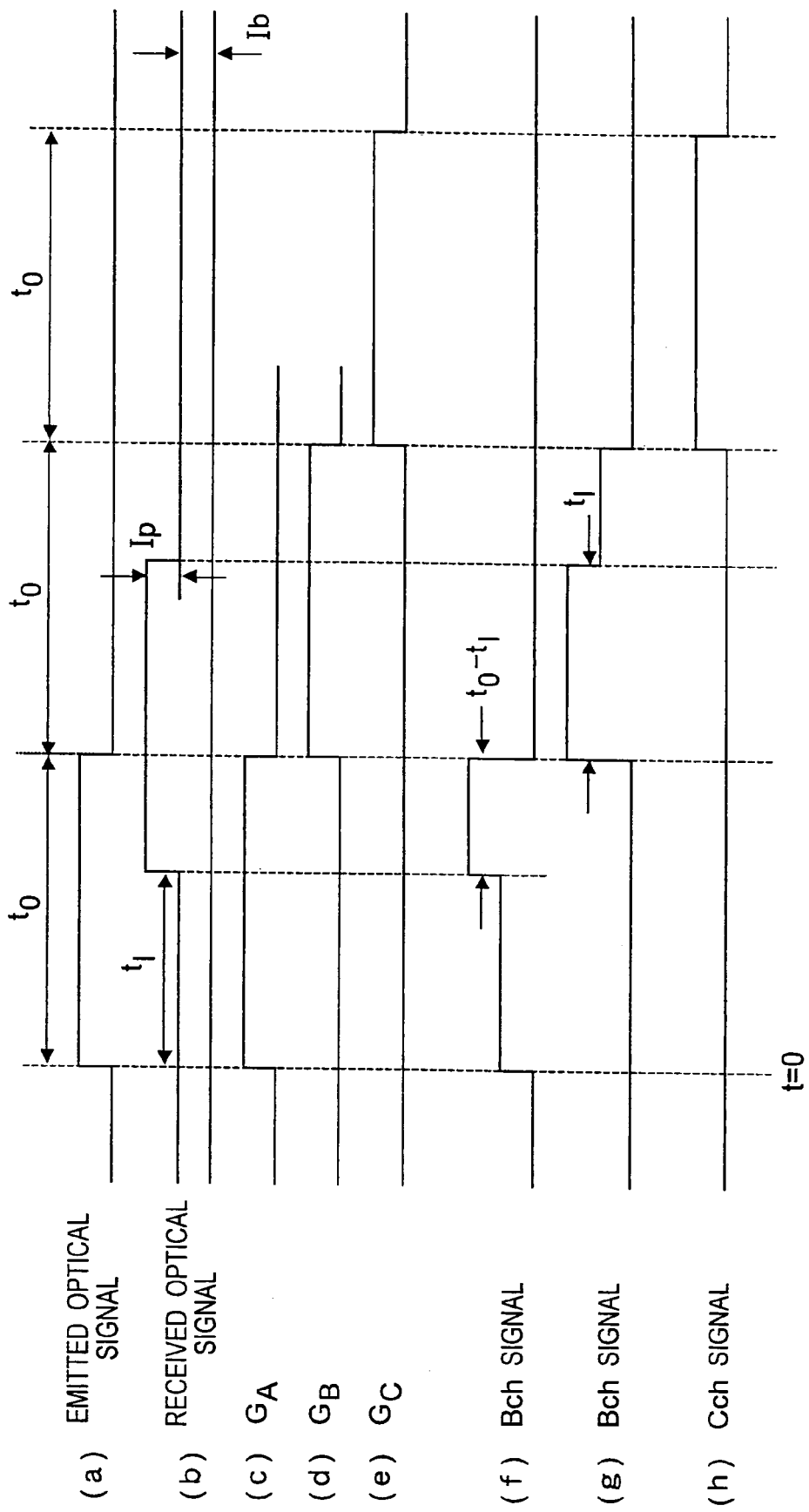

OPTICAL DISTANCE MEASURING APPARATUS

This nonprovisional application claims priority under 35 U.S.C. §119(a) on Patent Application Nos. 2005-313784 and 2005-327510 filed in Japan on Oct. 28, 2005 and Nov. 11, 2005, respectively, the entire contents of which are hereby incorporated by reference.

BACKGROUND OF THE INVENTION

The present invention relates to an optical distance measuring apparatus for measuring a transit time of light between a time when the light is emitted and a time when the light reflected by an object to be measured is detected by a photodetector, to detect the distance to the object.

A so-called time-of-flight (TOF) method which is a method of measuring a time required for light to travel to an object and back to calculate the distance to the object has been widely known as a distance measuring method. This distance measuring method is a method of measuring a time $\Delta t$ required for light to travel to an object and back and calculating the distance L to the object using the following Eq. (1) where the speed of light c is known as $3.0 \times 10^8$ m/s.

$$L = (c \cdot \Delta t)/2 \quad (1)$$

various specific signal processing methods in the TOF method have been proposed. For example, in a distance measuring apparatus disclosed in JP 6-18665A, a start pulse (synchronized with the operation of a light-emitting device) is used as a starting signal, electric charges are continuously stored in (or released from) an integrator until a stop pulse (received optical signal) is detected, and a round-trip time of light is obtained from the amount of increase (or decrease) in electric charge. Methods of measuring a time between the start pulse and the stop pulse include, for example, a method as used in the distance measuring apparatus disclosed in JP 7-294642A wherein counting the number of pulses of a reference clock is started simultaneously with the start pulse, and a round-trip time of light is obtained based on the number of pulses at a time when the stop pulse was detected.

However, in any of these methods, a current signal produced by a photodetector is converted to a pulse (voltage) signal, and signal processing is carried out with time information added to the pulse waveform. In general, an object to be measured is not specified, and the dynamic range of the amount of reflected light from an object to be measured or the like is very wide, so that in many cases there may be more noise components attributable to background light such as natural light than signal components. Under such a circumstance, it is very difficult to eliminate the noise attributable to the background light to extract the signal light pulse appropriately. Furthermore, a voltage waveform easily delays in phase under the influence of an environment (mainly a temperature environment), etc. For this reason, variation of a voltage waveform on the time axis becomes very large, and some time-correction means is thus required. In this case, the circuit configuration becomes very complicated, and will eventually lead to increase in manufacturing cost.

In contrast to this, R. Miyagawa et al. disclose that with using a photogate having a typical charge coupled device (CCD) structure, distance information can be obtained by processing a photoelectric current before converting a received optical signal to a voltage ("CCD-Based Range-Finding Sensor" IEEE Transactions on Electron Devices, Vol. 44, No. 10, October, 1997, pp. 1648-1652). FIG. 17 is a schematic cross-sectional view of an example of a photodetector having a photogate structure proposed by R. Miyagawa et al. FIG. 18 is a timing chart depicting the operation of the photogate structure.

In FIG. 17, the reference numeral 101 denotes a p-type semiconductor substrate, the reference numeral 102 denotes an n-type semiconductor layer forming a light-receiving section together with the p-type semiconductor substrate 101, the reference numeral 103 denotes an n-type semiconductor layer forming an electric charge storage section on a channel A (Ach), and the reference numeral 104 denotes an n-type semiconductor layer forming an electric charge storage section on a channel B (Bch). Furthermore, the reference numerals 105 and 106 each denote a gate having a metal oxide semiconductor (MOS) structure. The n-type semiconductor layer 102, the electric charge storage section 103, and the gate 105 constitute a switching MOS transistor 107 on Ach. Likewise, the n-type semiconductor 102, the electric charge storage section 104, and the gate 106 constitute a switching MOS transistor 108 on channel Bch.

A light-emitting device (not shown) applies light to an object to be measured according to the timing shown in FIG. 18(a). An optical signal reflected by the object is detected by the light-receiving section constituted by the p-type semiconductor substrate 101 and the n-type semiconductor layer 102 in FIG. 17, and becomes a received optical signal as shown in FIG. 18(b). As shown in FIGS. 18(a) and 18(b), the received optical signal is delayed from the emitted optical signal by a time $(t_1)$ required for the light to travel to the object and back. The gate 105 of the switching MOS transistor 107 on Ach is turned on and off in synchronization with the emitted optical signal, and the gate 106 of the switching MOS transistor 108 on channel Bch is turned on at a time when the gate 105 is turned off. In this case, the duration of the level "H" of the gate signals $G_A$ and $G_B$ which are input to the gates 105 and 106 is equal to the duration t0 of the level "H" of the emitted optical signal.

Switching operations of the switching MOS transistors 107 and 108 are carried out with the above timing, so that electric charges from the n-type semiconductor 102 for the period of time of $(t_0-t_1)$ shown in FIG. 18(e) are stored in the electric charge storage section 103 on Ach, and electric charges from the n-type semiconductor 102 for the period of time of $(t_1)$ are stored in the electric charge storage section 104 on channel Bch. These operations are repeated to increase signal components (in other words, stored electric charges) stored in the electric charge storage section 103 and 104, and then the signals on both of the channels are read out. The distance to the object can be measured by, for example, calculating the ratio between both of the signals.

According to the photogate structure shown in FIG. 17, information about the amount of the phase delay corresponding to the round-trip time of light is processed as the amount of stored electric charges (intensity). For this reason, even if there is any temperature change or the like for example, it is not necessary to consider variations in phase at signal processing. Thus, steady distance measurement is possible.

Under a typical environment, there is some kind of background light such as sunlight or illumination light (light from a fluorescent lamp or the like). When there is background light, the background light is superimposed on the received optical signal wave shown in FIG. 18. The modulating frequency of background light varies between zero (DC light) (in the case of sunlight) and several tens of kHz (in the case of light from an inverter-controlled lamp), but is of the order of some kHz at most under a typical living environment. In contrast to this, the TOF method generally uses a high frequency of the order of several tens of MHz because of a delay time measuring method using the speed of light. For this reason, the frequency of background light is sufficiently low as compared with the pulse wave of the received optical signal, and may be assumed to be zero (DC light) within one cycle of the pulse wave. FIG. 19 is a timing chart in the case that there is background light. As shown in FIGS. 19(e) and 19(f), in the case that there is background light, the amount of electric charges stored in the electric charge storage section 103 on Ach increases by an amount of the background light received for the period of time when the gate 105 is on, and the amount of electric charges stored in the electric charge storage section 104 on channel Bch increases by an amount of the background light received for the period of time when the gate 106 is on. For this reason, the delay time t1 cannot be obtained using the amounts of electric charges stored in the electric charge storage section 103 on Ach and the electric charge storage section 104 on channel Bch.

As opposed to such a problem, in a distance image sensor disclosed in JP 2004-294420A, an additional electric charge storage section (not shown) different from the electric charge storage sections 103 and 104 is provided to a structure similar to that in FIG. 17, and the background light only is monitored in the third time period, whereby the reflected light only is extracted from the Ach output and Bch output. FIG. 20 is a timing chart for this distance image sensor. A switching MOS transistor (not shown) on Cch having a gate (not shown) which is turned on by a gate signal $G_C$ having the pulse width $t_0$ subsequent to the gate signal $G_A$ on channel Ach and the gate signal $G_B$ on Bch as shown in FIG. 20 is provided around the light receiving section. In this case, there is no pulse signal based on the reflected light in the period of time when the gate signal $G_C$ is on, so that electric charges based on the background light only are stored and the intensity of the background light is monitored. Consequently, the distance to an object to be measured can be obtained from the three storage carriers (intensities) using the following Eq. (2) even under an environment where background light exists.

$$\frac{A - B}{A + B - 2C} = \frac{(t0 - 2t1)}{t0} \quad (2)$$

$$\rightarrow t1 = \frac{t0}{2}\left(1 - \frac{A - B}{A + B - 2C}\right)$$

In Eq. (2), A is the amount of electric charges stored in the electric charge storage section 103 on a channel Ach, B is the amount of electric charges stored in the electric charge storage section 104 on Bch, and C is the amount of electric charges stored in the electric charge storage section (for background light) on Cch.

However, the distance image sensor disclosed in JP 2004-294420A has a problem as described below. That is, the brightness of background light as described above is up to several hundred thousands of luxes under sunlight outdoors, for example, and is several thousands of luxes even indoors such as in an office lighted relatively well. As is easily calculated, a photoelectric current obtained from such strong background light becomes the order of milliamperes or larger when an ordinary photodiode is used as the photodetector, although it depends on the optical system or the light-receiving area of the photodiode. In contrast to this, the amount of light reflected by an object to be measured is heavily dependent on the state of reflection at the surface of the object and the distance to the object, so that, for example, even if a high-power laser diode (LD) (several hundreds of milliwatts) is used as the light-emitting device, there is a case that when the distance to the object is of several meters, the amount of light incident to the photodetector becomes small to the order of nanowatts.

Under such an environment, the SN ratios of electric charges stored in the storage sections 103 and 104 in FIG. 17 are very low, and a trace amount of signal components thus exist among noise components which make up the major portion of the received optical signal. Since the capacities for electric charges of the storage sections 103 and 104 are limited, the number of repetitions of storage operations of electric charges is limited by the noise components, so that the lower the SN ratios, the larger the error of a measured distance becomes.

BRIEF SUMMARY

It is therefore a feature of the exemplary illustrative embodiment presented herein to provide an optical distance measuring apparatus having a high accuracy of distance measurement even under an environment where background light is strong.

In order to accomplish the above object, there is provided, according to a first example embodiment, an optical distance measuring apparatus for measuring a transit time of light between a time when the light is emitted and a time when the light reflected by an object to be measured is received, to detect a distance to the object, comprising:

a light-emitting device for emitting an optical signal which is synchronized with a modulating signal having a predetermined repetition frequency;

a photodetector for receiving the optical signal from the light-emitting device reflected by the object and converting the optical signal to an electrical signal;

a switch for alternately choosing at least two channels for the electrical signal from the photodetector with a predetermined timing;

a storage/differential operation section for storing electrical signals on the channels alternately chosen by the switch and performing a differential operation on the stored electrical signals; and a distance determining section for determining the distance to the object on the basis of a result of the differential operation of the storage/differential operation section.

In the optical distance measuring apparatus as configured above, electrical signals on the channels alternately chosen with a predetermined timing are stored, and a differential operation on the stored electrical signals is performed, so that noise components such as background light are eliminated as appropriate. Only signal components stored as the result of the differential operation is extracted. The distance determining section detects the transit time required for the light to go to the object and back from the result of storage operations performed until a sufficient amount of signal components has been obtained, thereby performing a high-precision distance operation.

In one embodiment, the storage/differential operation section comprises an integrator having a capacitive element, and the electrical signal is stored by the integrator.

In this embodiment, a capacitive element which is a typical passive element is used in the storage/differential operation section, so that any special structure is not required for the light-receiving section, and the light-receiving section may be thus constituted using typical circuit elements.

In one embodiment, a first channel and a second channel are chosen alternately by the switch; the integrator of the storage/differential operation section comprises a first integrator connected with the first channel and a second integrator connected with the second channel; and the storage/differential operation section performs a differential operation on an output of the first integrator and an output of the second integrator.

In this embodiment, the storage/differential operation section performs a differential operation on the outputs of the first integrator and second integrator, so that the apparatus may be of a simplest-circuit configuration.

In one embodiment, capacitance values of the capacitive elements in the first and second integrators are equal or generally equal to each other.

In this embodiment, the capacitance values of the capacitive elements of the first integrator and the second integrator are equal or substantially equal, so that a differential operation on the output of the first integrator and the output of the second integrator can be implemented easily and accurately.

In one embodiment, at least the photodetector, the first integrator, and the second integrator are made on one semiconductor substrate.

In this embodiment, at least the first integrator and the second integrator are made on one and the same semiconductor substrate, so that the characteristics of the first and second integrators can be ideally equal, and the error between the first integrator and the second integrator can be thus reduced, thereby allowing high-precision distance measurement.

In one embodiment, the storage/differential operation section comprises an integrator having a capacitive element, and performs a differential operation while storing the electrical signal by the integrator.

In this embodiment, the integrator using a capacitive element of the storage/differential operation section performs a differential operation on electrical signals including background light components and signal light components while storing electrical signals, so that the number of parts may be reduced and the storage means is not saturated with background components even under an environment such as the outdoors where background light is strong.

In one embodiment, a differential operation is performed by alternately choosing the channels for an photoelectric current detected by the photodetector and reversing a direction in which the photoelectric current to be input to an input terminal of the integrator flows.

In this embodiment, a differential operation can be performed by inverting, with a predetermined timing, by a switching operation of the switch, the direction of a current which acts on the integrator of the storage/differential operation section. For this reason, by the single integrator, a differential operation can be performed while storing a signal component which is the result of the operation.

In one embodiment, the photodetector comprises a first photodetector whose cathode is connected with a power supply, and a second photodetector whose anode is connected with a reference potential; and the switch connects the anode of the first photodetector to the input terminal of the integrator of the storage/differential operation section while connecting the cathode of the second photodetector to the input terminal of the integrator of the storage/differential operation section, with predetermined timing.

In this embodiment, the switch is turned to the anode of the first photodetector and the cathode of the second photodetector alternately with a predetermined timing, so that the direction of a current which acts on the integrator can be inverted effectively.

In one embodiment, the first photodetector and the second photodetector are equal in structure and size.

In this embodiment, the first photodetector and the second photodetector are equal in structure and size, so that the output characteristics of them are equal, thereby reducing the error of a current which acts on the integrator.

In one embodiment, at least the first photodetector and the second photodetector are made on one semiconductor substrate.

In this embodiment, the first photodetector and the second photodetector are made on the same semiconductor substrate, so that the error between the output characteristics of the first and second photodetectors is negligible, and the first and second photodetectors can be disposed very near to each other, thereby eliminating the unevenness in application of an optical signal between the first and second photodetectors. For this reason, high-precision distance measurement is possible.

In one embodiment, the optical distance measuring apparatus further comprises:

a current-discharging type first mirror circuit for producing two currents equal in magnitude to a current flowing into the photodetector; and a current-absorbing type second current mirror circuit to which one of the two currents produced by the first current mirror circuit is input, and which produces a current equal in magnitude to the one of the two currents, wherein the switch is operated in such a manner that inputting the other of the two currents produced by the first mirror circuit to the input terminal of the integrator and inputting the current produced by the second mirror circuit to the input terminal of the integrator are carried out alternately with the predetermined timing.

In this embodiment, the first and second current mirror circuits produce currents which are equal to the current produced by the photodetector. Therefore, a photoreceiver can be constituted by one photodetector and one integrator, and thereby the number of parts can be reduced and there is no error based on a characteristic difference between photodetectors or between integrators.

In one embodiment, the optical distance measuring apparatus further comprises:

a constant current source;

a current-discharging type first current mirror circuit for producing two currents equal in magnitude to a current flowing through the constant current source; and a current-absorbing type second current mirror circuit for producing two currents equal in magnitude to the current flowing through the constant current source, wherein an anode of the photodetector is connected with one of output-side terminals of the first current mirror circuit, and a cathode of the first photodetector is connected with the other of the output-side terminals of the first current mirror circuit; and wherein the switch is operated in such a manner that connecting one of the output-side terminals of the first current mirror circuit to the input terminal of the integrator while connecting the other of the output-side terminals of the first current mirror circuit to a resistive load, and connecting the other of the output-side terminals of the first current mirror circuit to the input terminal of the integrator while connecting the one of the output-side terminals of the first current mirror circuit to the resistive load are carried out alternately with the predetermined timing.

In this embodiment, a photodetector is connected between two channels on which a constant current equal to the current of the constant current source flows, and the amount of current variations corresponding to the photoelectric current can be extracted, so that the impedance of the photodetector can be reduced, thereby allowing a high-speed response. Furthermore, two channels on which a constant current equal to the current of the constant current source flows are provided, so that the direction of current which acts on the integrator can be reversed by the switch operated in such a way that connecting one of the output-side terminals of the first current mirror circuit to the input terminal of the integrator while connecting the other of the output-side terminals of the first current mirror circuit to a resistive load, and connecting the other of the output-side terminals of the first current mirror circuit to the input terminal of the integrator while the one of the output-side terminals of the first current mirror circuit are carried out alternately with the predetermined timing.

In one embodiment, the switch comprises a first switch and a second switch, the storage/differential operation section comprises a first storage section and a second storage section; the photodetector is disposed adjacent to the first switch and the second switch, the first storage section is disposed adjacent to the first switch, the second storage section is disposed adjacent to the second switch, the storage/differential operation section performs a differential operation on signals stored in the first storage section and the second storage section, and at least the photodetector, the first switch, the second switch, the first storage section, and the second storage section are made on one semiconductor substrate.

In this embodiment, the first and second switches are disposed adjacent to the photodetector, the first and second storage sections are disposed adjacent to the first and second switches, respectively, and the photodetector, the switches, and the storage sections are made on the same semiconductor substrate, so that this apparatus can be configured in a high density, thereby being made compact and reducing the manufacturing cost. In addition, this apparatus may comprise a single photodetector and a single storage/differential operation section (differential operation, signal storage).

In one embodiment, the photodetector, the first switch, the second switch, the first storage section, and the second storage section are bilaterally symmetric with respect to a center line of the photodetector.

In this embodiment, the photodetector, the first and second switches, the first and second storage sections are bilaterally symmetric with respect to the center line of the photodetector, so that electric charges are evenly stored in the first storage section and the second storage section, thereby improving the accuracy of distance measurement and effectively eliminating the background light by a differential operation.

In one embodiment, the optical distance measuring apparatus comprises two units each having the photodetector, the switch, and the storage/differential operation section.

In this embodiment, two units each having the photodetector, the switch, and the storage/differential operation section are provided, so that the effect of the intensity of received light from the object can be eliminated, thereby allowing accurate distance measurement.

In one embodiment, the two units are a first unit and a second unit, and the distance determining section calculates a ratio between an output of the first unit and an output of the second unit, and determines the distance to the object on the basis of the ratio.

In this embodiment, the ratio between the first and second units is calculated to determine the distance to the object, so that the influence of the background light can be eliminated, and the intensity of the received light from the object can be normalized, thereby allowing accurate distance measurement.

In one embodiment, the two units are a first unit and a second unit, and when the first unit has a switching time of T, the second unit has a switching time of 2T or more.

In this embodiment, the switching time of the second unit is twice or more as long as the first unit, so that the second unit is capable of detecting the intensity of the received light from the object, and the first unit can be thus normalized effectively with the intensity of the received light, thereby allowing accurate distance measurement.

In one embodiment, a switching signal for driving the switch varies between a first storage time period during which the switching signal drives the switch for the switching time of T and a second storage time period during which the switching signal drives the switch for the switching time of 2T or more.

In this embodiment, the switch is operated for the switching time T and for the switching time 2T or more, so that the result measured for the switching time T is stored and subsequently the result measured for the switching time 2T is obtained by the same element. The distance can be calculated from the two results, so that this apparatus is not required to use two units, thus being made compact.

In one embodiment, the modulating signal is a pulse wave.

In this embodiment, the modulating signal is a pulse wave, so that the resolution can be constant over the full distance-measuring range.

In one embodiment, the first unit and the second unit have same switching times, and the modulating signal includes a sinusoidal wave signal.

In this embodiment, the modulating signal is a sinusoidal wave, and the switching time of the first unit and the switching time of the second unit are substantially equal, so that the background can be eliminated effectively and the phase delay of the received optical signal can be detected, thereby allowing accurate distance measurement.

In one embodiment, the two units are a first unit and a second unit, the storage/differential operation section of the first unit and the storage/differential operation section of the second unit each comprise an integrator having a capacitive element, and the capacitive elements in the integrators of the storage/differential operation sections of the first and second units have generally equal capacitance values.

In this embodiment, the capacitance value of the capacitive element in the integrator of the first unit is generally equal to the capacitance value of the capacitive element in the integrator of the second unit, so that the intensity of the received light can be normalized effectively.

In one embodiment, the two units are a first unit and a second unit; and the first unit and the second unit are made on one semiconductor substrate.

In this embodiment, the first unit and the second unit are made on one and the same semiconductor substrate, so that there is no difference in element between the first unit and the second unit, and thereby the influence of background light can be eliminated effectively and high-precision distance measurement is possible.

In one embodiment, the light-emitting device is a light-emitting diode.

In this embodiment, the light-emitting device is a light-emitting diode, so that high-precision distance measurement is possible even under an environment where background light is strong.

In one embodiment, the light-emitting device is a laser diode.

In this embodiment, the light-emitting is a laser diode, so that light having a high density of energy can be applied to a farther object to be measured, thereby expanding the distance measurable range.

In one embodiment, the optical distance measuring apparatus further comprises a scanning mechanism for scanning with an optical beam emitted from the light-emitting device.

In this embodiment, a scanning mechanism for scanning with an optical beam emitted from the light-emitting device is provided, so that distance measurement for an object to be measured in a wide range is possible, thereby expanding the application range of an optical distance measuring apparatus according to the present invention.

There is also provided, according to another example embodiment, an optical distance measuring apparatus comprising:

a transmitter for transmitting light in synchronization with a modulating signal having a repetition frequency;

a receiver for receiving light which has been transmitted from the transmitter and reflected by an object to be measured, and outputting a signal corresponding to the received optical signal; and a signal processing section for processing the signal output from the receiver, the receiver comprising:

a photodetector for converting a received optical signal to an electrical signal;

a switch for alternating choosing at least two channels for the electrical signal from the photodetector with a predetermined timing which is synchronized with the modulating signal; and a plurality of storage sections which are each disposed on one of the channels and stores electrical signals on the channels alternately chosen by the switch, the signal processing section comprising:

an operation section for performing a differential operation on electrical signals stored in the storage sections on the channels alternately chosen by the switch;

a storage time determining section for determining a storage time of the storage sections on the basis of a result of the differential operation by the operation section; and a distance determining section for determining a distance to the object using the result of the differential operation performed by the operation section on electrical signals stored in the storage sections for the storage time determined by the storage time determining section.

In this embodiment, a differential operation on electrical signals stored in the storage sections disposed on the two channels which are alternately chosen by the switch is performed by the operation section, so that noise components such as the background light are removed as appropriate from the result of the operation by the operation section. Thus, only signal components based on the reflected light from the object are extracted by the above operation and are stored. In addition, the storage time for the storage sections is determined based on the result of the above operation by the storage time determining section, so that only signal components obtained after the background light has been removed may be stored until the amount of stored signal components becomes sufficient for distance measurement.

As a result of this, the storage sections are not saturated with noise components even under, for example, an environment such as the outdoors where background light is very strong, so that an elapsed time between a time when light is emitted from the transmitter and a time when light reflected by the object is received by the receiver can be obtained accurately on the basis of the sufficiently stored signal components, and thereby the distance to the object can be determined with high precision by the distance determining section.

In one embodiment, the storage time determining section determines the storage time by comparing the result of the differential operation by the operation section with a threshold.

In this embodiment, the storage time for the storage sections is determined by comparing the result of the operation by the operation section with a threshold, so that the storage time determining section can be easily comprised of a comparator, and the storage time can be determined with reliability.

In one embodiment, the storage time determining section determines the storage time such that the storage time satisfies the following relationship:

$T\text{sum} = m \times T$ where Tsum is the storage time, T is the repetition frequency of the modulating signal, and m is a minimum integer which satisfies m>t/T, where t is a time required for the result of the differential operation by the operation section to reach the threshold.

In this embodiment, the storage time Tsum is determined to be the minimum value which satisfies the above relation, so that even if the result of the differential operation has reached the threshold while an electrical signal for one cycle of the modulating signal are being stored, the electric signal can be charged every one cycle of the modulating signal. Consequently, it is not necessary to stop the operations of the storage sections and the operation section in an incomplete state, and the distance to the object can be thus determined accurately.

In one embodiment, the receiver and the signal processing section comprise two units each having the photodetector, the switch, the storage sections, and the operation section;

a switching interval of the switch in a first unit which is one of the two units is twice or more as long as a switching interval of the switch in a second unit which is the other of the two units;

the storage time determining section determines a storage time for the storage sections of the first unit and a storage time for the storage sections of the second unit by comparing the result of the differential operation by the operation section of the first unit with a threshold; and the distance determining section determines the distance to the object using the result of the differential operation by the operation section of the first unit and the result of the differential operation by the operation section of the second unit.

In this embodiment, the switching interval of the switch of the first unit of the two units each having the photodetector, the switch, the storage sections, and the operation section is twice or more as long as the switching interval of the switch of the second unit. For this reason, if the switching interval of the switch of the second unit is made equal to the repetition period of the modulating signal, the whole of a received optical signal based on the reflected light from the object is included in the electrical signals stored in the storage sections on the channels of the first unit. As a result, it is possible to monitor the intensity of the received optical signal by a differential operation on the signals stored in the storage sections on the channels performed by the operation section of the first unit.

That is, according to an example embodiment, the distance to the object can be determined accurately on the basis of the result of the differential operation by the operation section of the first unit and the result of the differential operation by the operation section of the second unit even under an environment where the intensity of a received optical signal based on the reflected light is unknown and background light is strong.

In addition, by monitoring the intensity of the received optical signal based on the reflected light, the results of the differential operations can be stored until sufficient signals necessary for measurement of the distance to the object are stored, thereby determining the distance to the object accurately.

In one embodiment, the storage time for the storage sections of the first unit and the storage time for the storage sections of the second unit are equal.

In this embodiment, the storage time for the storage sections of the first unit and the storage time for the storage sections of the second unit are equal, thereby facilitating the calculation and determination of the distance subsequently performed by the distance determination section.

In one embodiment, the optical distance measuring apparatus further comprises a control section for controlling the timing of choosing the channels alternately by the switch and for erasing the electrical signals stored in the storage sections, wherein the control section makes the switch to choose the channels alternately with a first timing, and when the storage time for the storage sections has been determined by the storage time determining section, the control section erases the electrical signals stored in the storage sections and then makes the switch to choose the channels alternately with a second timing to store electrical signals corresponding to the determined storage time in the storage sections; and the distance determining section determines the distance to the object using the result of the differential operation performed by the operation section when the channels have been chosen alternately by the switch with the first timing, and the result of the differential operation performed by the operation section when the channels have been chosen alternately by the switch with the second timing.

In this embodiment, in the first time period, the switch is operated with the first timing, and the storage time determining section determines the storage time for storage sections and determines the length of the second time period on the basis of the storage time. Moreover, in the second time period, the switch is operated with the second timing, and the distance determining section determines the distance to the object using the results of the differential operations by the operation section in the first time period and the second time period. Thus, if the switching interval of the switch in the first time period is made twice or more as long as the switching interval of the switch in the second time period, and the switching interval of the switch in the second time period is made equal to the repetition period of the modulating signal, the whole of the received optical signal of the reflected light from the object is included in the electrical signals stored in the storage sections on the channels in the first time period. As a result, it is possible to monitor the intensity of the received optical signal by a differential operation on the signals stored in the storage sections on the channels performed by the operation section in the first unit.

That is, in this embodiment, the distance to the object can be determined accurately on the basis of the result of the differential operation by the operation section in the first time period and the result of the differential operation by the operation section in the second time period even under an environment where the intensity of the received optical signal based on the reflected light is unknown and background light is strong.

In other words, according to this embodiment, the same effect as an optical distance measuring apparatus comprising two units each having the photodetector, the switch, the storage sections, and the operation section can be achieved by a configuration having one of the two units. Consequently, this optical distance measuring apparatus can be made more compact than an optical distance measuring apparatus comprising the two units.

In one embodiment, when the result of the differential operation by the operation section has not reached the threshold within a first predetermined time, the storage time determining section determines that it is impossible to determine the storage time; and when the storage time determining section has determined that it is impossible to determine the storage time, the distance determining section determines that it is impossible to determine the distance to the object.

When the result of the differential operation by the operation section has not reached the threshold within the first predetermined time, it is assumed that the amount of reflected light received by the photodetector is too weak for the reasons that the distance to the object is too long, the reflectivity of the object is extremely low, the reflected light is too strong because the surface of the object is like a mirror surface, and/or the like.

In this embodiment; when the result of the differential operation by the operation section has not reached the threshold within the first predetermined time, it is determined that it is impossible to determine the storage time, and that it is impossible to determine the distance to the object, so that when the amount of reflected light received by the photodetector is too weak because of the above reasons, it can be prevented to determine the distance to the object improperly.

In one embodiment, when the result of the differential operation by the operation section has reached the threshold within a second predetermined time that is shorter than the first predetermined time, the storage time determining section determines that it is impossible to determine the storage time, and when the storage time determining section determines that it is impossible to determine the storage time, the distance determining section determines that it is impossible to determine the distance to the object.

When the result of the operation by the operation section has reached the threshold within the second predetermined time shorter than the first predetermined time, the number of storage operations of electrical signals to the storage sections may become small for the reason, such as a short distance to the object, too strong reflected light because the surface of the object is like a mirror surface, and so on, so that a sufficient effect of averaging cannot be obtained, and thus an measurement error per measurement may have a large influence on the measurement result.

In this embodiment, when the result of the differential operation by the operation section has reached the threshold within the second predetermined time, it is determined that it is impossible to determine the storage time and that it is impossible to determine the distance to the object, so that when a sufficient effect of averaging is not obtained and an measurement error per measurement has a large influence on the measurement result as described above, the distance determining section is prevented from erroneous determination of the distance to the object.

BRIEF DESCRIPTION OF THE DRAWINGS

The present technology will become more fully understood from the detailed description given hereinbelow and the accompanying drawings which are given by way of illustration only, and thus are not intended to limit the present invention, and wherein:

FIG. 11A is a cross-sectional view of a main part of a receiver of an optical distance measuring apparatus of an eighth example embodiment;

FIG. 11B shows a potential distribution taken along the line XIB-XIB in FIG. 11A;

FIG. 20 is a timing chart depicting the operation of a conventional distance image sensor.

DETAILED DESCRIPTION

The optical distance measuring apparatus according to the present tecnology invention will be described below with reference to example embodiments shown in the figures.

First Embodiment

Figure 1:
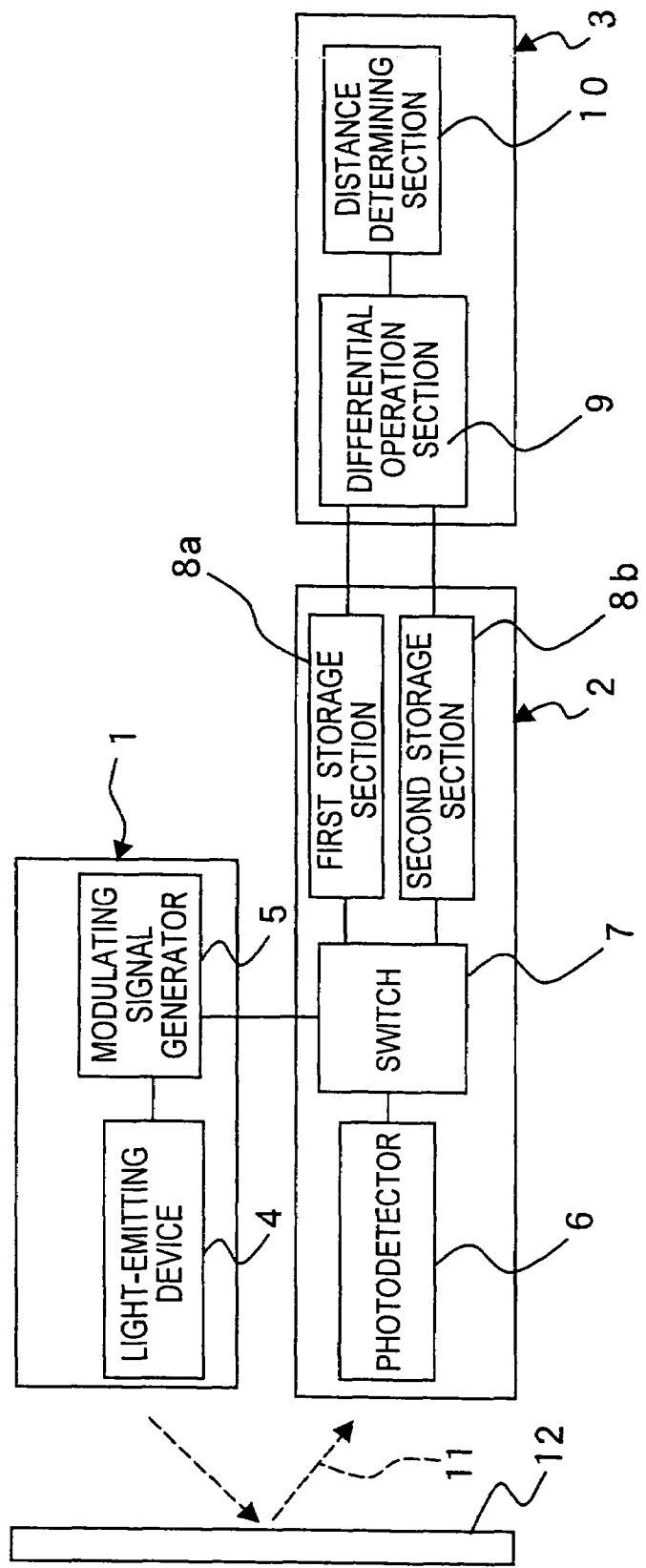
FIG. 1 is a block diagram showing the configuration of an optical distance measuring apparatus of a first example embodiment.
Figure 2:
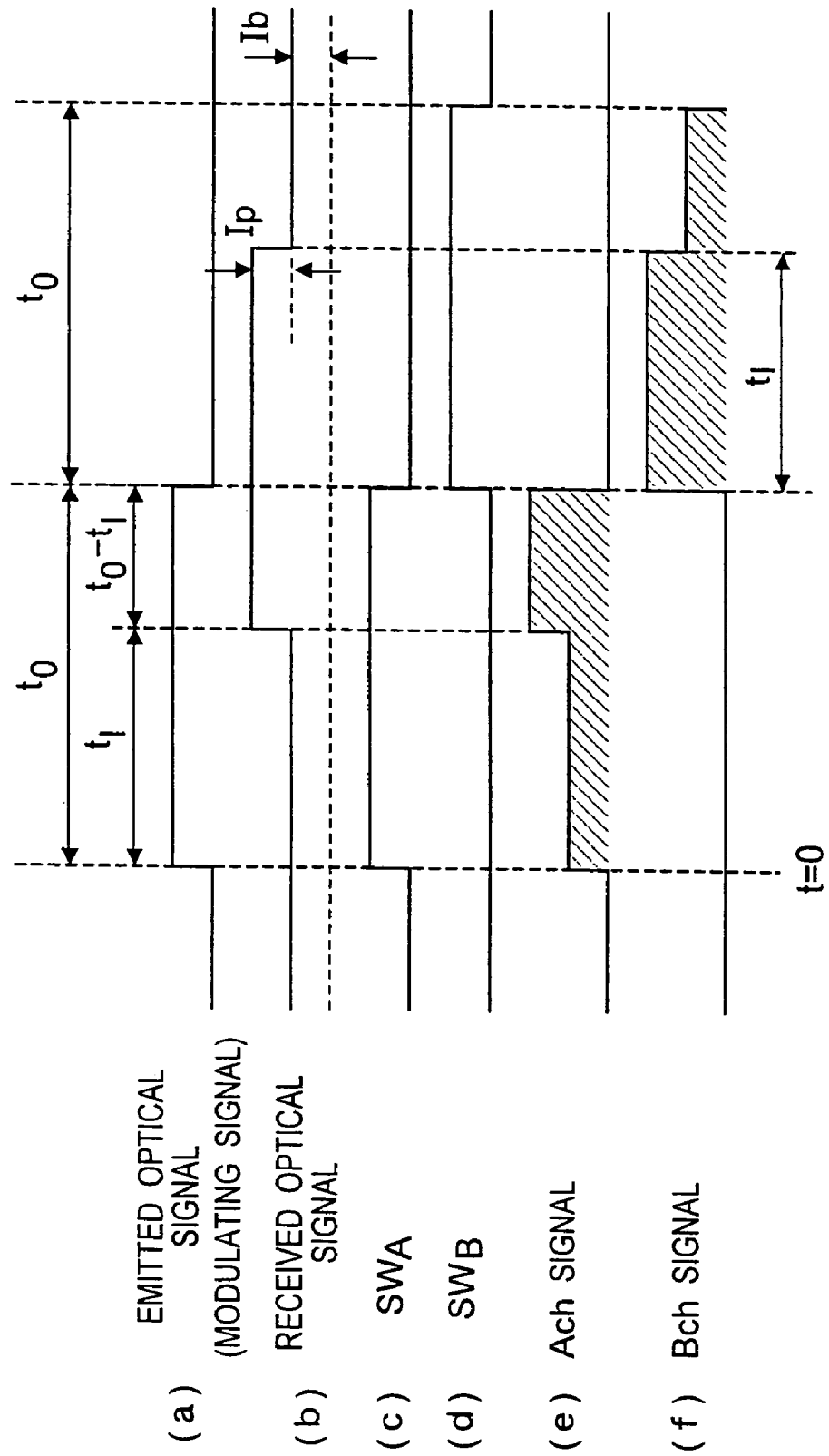
FIG. 2 is a timing chart depicting the operation of the optical distance measuring apparatus shown in FIG. 1.

FIG. 1 is a block diagram of an optical distance measuring apparatus of a first example embodiment, and FIG. 2 is a timing chart depicting the operation of the optical distance measuring apparatus shown in FIG. 1. Outline of the optical distance measuring apparatus according to the present techology will be described with reference to FIGS. 1 and 2.

The optical distance measuring apparatus has, as shown in FIG. 1, a transmitter 1 for emitting an optical beam 11 as an optical signal to an object to be measured 12, a receiver 2 for receiving the optical beam 11 reflected by the object 12, and a signal processing section 3 for processing a signal from the receiver 2.

The transmitter 1 has a light-emitting device 4 for emitting an optical signal which is synchronized with a modulating signal having a predetermined repetition frequency, and a modulating signal generator 5 for outputting the modulating signal to the light-emitting device 4.

The receiver 2 has a photodetector 6 for receiving an optical beam 11 reflected by the object 12 and converting the optical beam to an electrical signal, a switch 7 for receiving an signal from the modulating signal generator 5 and alternately choosing two channels for an electrical signal from the photodetector 6 with a predetermined timing, and first and second storage sections 8$a$ and 8$b$ for storing electrical signals on the two channels, respectively, alternately chosen by the switch 7. The switch 7 receives switching signals $SW_A$ and $SW_B$ to perform the switching operation.

Furthermore, the signal processing section 3 has a differential operation section 9 for performing a differential operation on electrical signals stored in the first and second storage sections 8$a$ and 8$b$, and a distance determining section 10 for determining the distance to the object 12 on the basis of the result of the differential operation of the differential operation section 9.

The first and second storage sections 8$a$ and 8$b$ and the differential operation section 9 constitute a storage/differential operation section.

As shown in FIG. 1, an optical beam 11 is emitted from the light-emitting device 4 toward the object 12 in synchronization with the signal from the modulating signal generator 5. The emitted optical signal (modulating signal) is, as shown in FIG. 2($a$), a pulse wave having a certain repetition frequency and a pulse width of $t_0$. However, the modulating signal is not limited to a pulse wave, and may be a triangular wave, a saw-tooth wave, a sinusoidal wave, or any other wave that can be expressed as a function of time so that the wave can function similarly to the pulse wave, which will be used in the following description. Details of other modulating signals than the pulse wave will be described later.

The optical beam 11 reflected by the object 12 is, as shown in FIG. 2($b$), detected by the photodetector 6 with a phase delay from the modulating signal by a time, $t_1$, necessary for the optical beam 11 to travel the distance to the object 12 and back. In FIG. 2($b$), Ip represents the intensity of a received optical signal based on the reflected light, and Ib represents the intensity of a noise based on the background light. When the measurable distance range is 7.5 m, it can be found easily from Eq. (1) that a pulse width of 50 nsec is required. In addition, background light is of the order of several dozen kHz at most, and its cycle is of the order of several dozen μsec which is sufficiently larger than the pulse width of 50 nsec, thereby being assumed to be DC light in the period of time of the pulse width as shown in FIG. 2.

The channels for the received optical signal are chosen alternately with the timings of the switching signals $SW_A$ and $SW_B$ (shown in FIGS. 2($c$) and 2($d$)) by the switch 7. On the first channel (Ach), the first storage section 8$a$ is provided. Electric charge per one cycle of the modulating signal, given by $$Ip(t_0 - t_1) + Ib \cdot t_0,$$

is stored in the first storage section 8$a$ as an Ach signal shown in FIG. 2($e$). On the second channel (Bch), the second storage section 8$b$ is provided. Electric charge per one cycle of the modulating signal, given by $$Ip \cdot t_1 + Ib \cdot t_0,$$

is stored in the second storage section 8b as a Bch signal shown in FIG. 2(f).

Outputs of the first and second storage sections 8a and 8b are input to the signal processing section 3, and the difference between them is calculated by the differential operation section 9. The differential signal after the differential operation can be expressed by the following Eq. (3) using the number of integrations, N.

$$\text{Differential Signal} = N \cdot [Ip(t_0 - t_1) + Ib \cdot t_0] - \qquad (3)$$
$$N \cdot [Ip \cdot t_1 + Ib \cdot t_0]$$
$$= N \cdot Ip(t_0 - 2t_1)$$

As is apparent from above, the background light is perfectly eliminated after the differential operation. Also, the number of integrations may be set so as to get a sufficient amount of signals. Therefore, the distance value can be obtained by finding the time $t_1$ from. Eq. (3) and substituting the time $t_1$ into Eq. (1).

However, the distance can be measured using Eq. (3) only when the intensity Ip of the received optical signal is known, more specifically, when using a measuring system in which the transmitter and the receiver are opposed to each other and a light-emitting device that emits coherent light, such as a laser, is used so that the light is directly received without dispersing the energy of the light. In such a case, the emitted energy and the received energy are equal, so that if the intensity Ip of the received optical signal is measured in advance, the distance can be measured using Eq. (3). Only in such an exceptional case, the distance can be determined using Eq. (3) only. In most of typical distance measuring apparatuses, however, the transmitter and the receiver are disposed in the same position, and the reflected light from the object is detected to measure a time required for the light to travel the distance to the object and back.

For this reason, providing two units each having the receiver 2 and the differential operation section 9 allows the distance to be measured by detecting the reflected light from the object. This will be detailed below.

Second Embodiment

Figure 3:
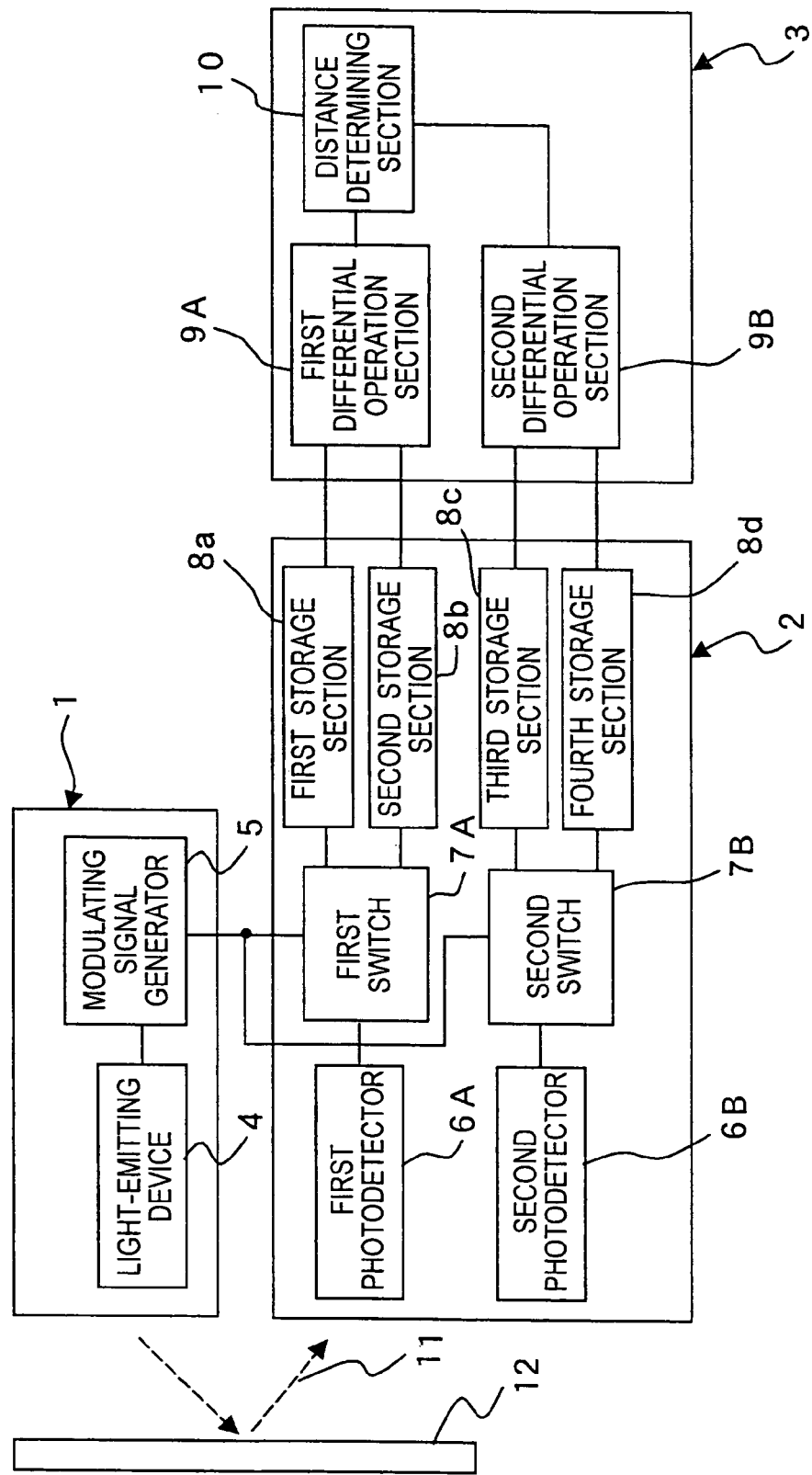
FIG. 3 is a block diagram of an optical distance measuring apparatus of a second example embodiment.
Figure 4:
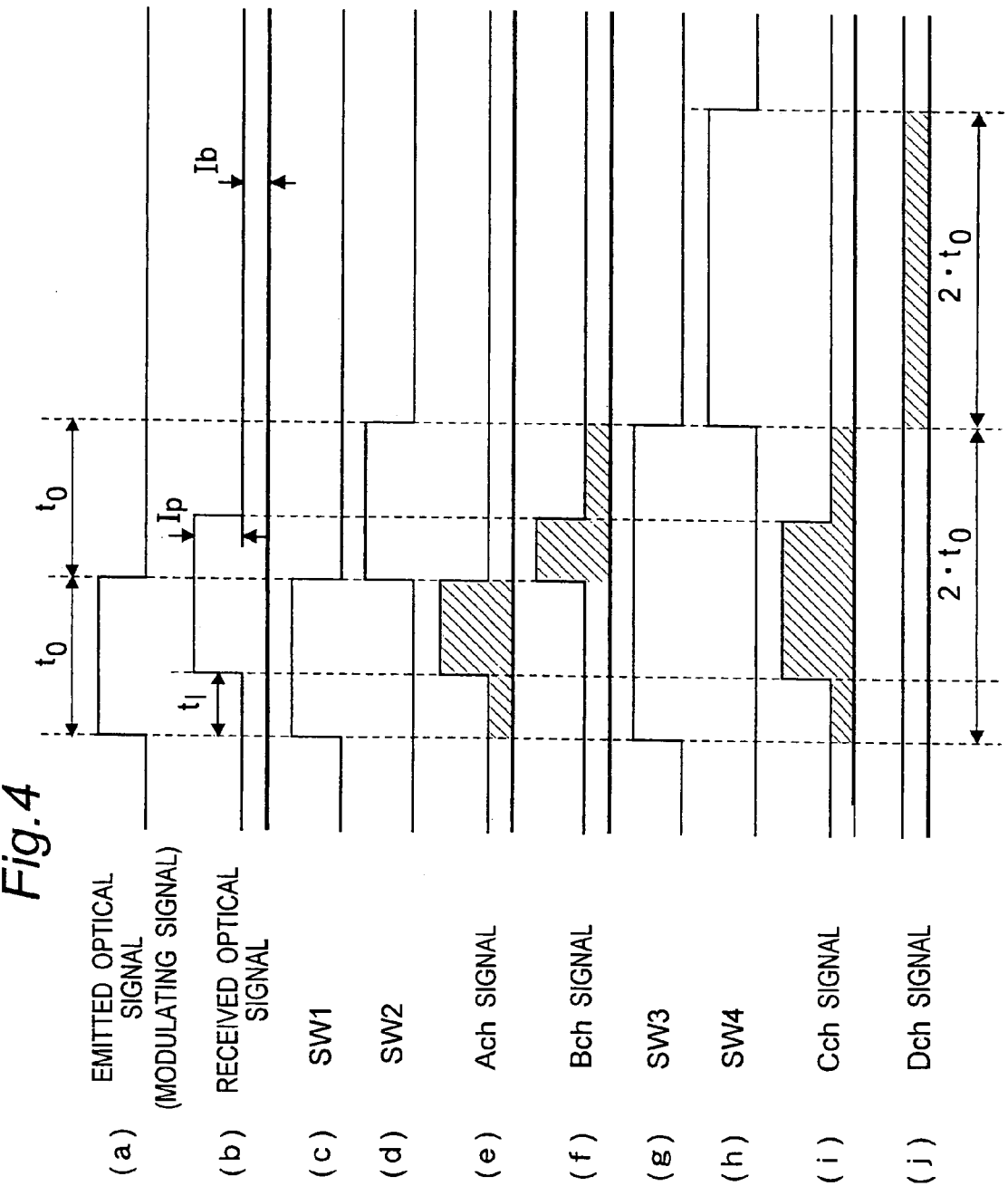
FIG. 4 is a timing chart depicting the operation of the optical distance measuring apparatus shown in FIG. 3.

FIG. 3 is a block diagram of an optical distance measuring apparatus of a second example embodiment, and FIG. 4 is a timing chart depicting the operation of the optical distance measuring apparatus. Outline of the optical distance measuring apparatus of this embodiment will be described with reference to FIGS. 3 and 4. In FIG. 3, the same components as those in FIG. 1 are denoted by the same symbols.

This optical distance measuring apparatus has, as shown in FIG. 3, a transmitter 1 for emitting an optical beam 11 as an optical signal to an object 12 to be measured, a receiver 2 for receiving the optical beam 11 reflected by the object 12, and a signal processing section 3 for processing signals from the receiver 2.

The transmitter 1 has a light-emitting device 4 for emitting an optical signal which is synchronized with a modulating signal having a predetermined repetition frequency, and a modulating signal generator 5 for outputting the modulating signal to the light-emitting device 4.

The receiver 2 has first and second photodetectors 6A and 6B for receiving an optical beam 11 reflected by the object 12 and converting the optical beam to an electrical signal, a first switch 7A for receiving a signal from the modulating signal generator 5 to alternately choose the two channels for an electrical signal from the photodetector 6A with a predetermined timing, a second switch 7B for receiving a signal from the modulating signal generator 5 to alternately choose the two channels for an electrical signal from the photodetector 6B with a predetermined timing, first and second storage sections 8a and 8b for storing electrical signals on the two channels, respectively, alternately chosen by the switch 7A, and third and fourth storage sections 8c and 8d for storing electrical signals on the two channels, respectively, alternately chosen by the switch 7B. The switch 7A receives switching signals SW1 and SW2 from the modulating signal generator 5 to perform the switching operation, and the switch 7B receives switching signals SW3 and SW4 from the modulating signal generator 5 to perform the switching operation.

Furthermore, the signal processing section 3 has a first differential operation section 9A for performing a differential operation on electrical signals stored in the first and second storage sections 8a and 8b, a second differential operation section 9B for performing a differential operation on electrical signals stored in the first and second storage sections 8c and 8d, and a distance determining section 10 for determining the distance to the object 12 on the basis of the result of the differential operations of the differential operation sections 9A and 9B.

The first to fourth storage sections 8a, 8b, 8c and 8d and the first and second differential operation sections 9A and 9B constitute a storage/differential operation section. In addition, the first photodetector 6A, the first switch 7A, the first and second storage sections 8a and 8b, and the first differential operation section 9A constitute a first unit, and the second photodetector 6B, the second switch 7B, the third and fourth storage sections 8c and 8d, and the second differential operation section 9B constitute a second unit.

As shown in FIG. 3, the optical beam 11 reflected by the object 12 is detected by the first photodetector 6a and the second photodetector 6b. For the first and second channels of the first unit represented by the character "A" attached to the reference numbers in FIG. 3, processing is made, as shown in FIGS. 4(a) to 4(f), with a timing similar to that shown in FIGS. 2(a) to 2(f). Thus, the output related to the channels (first and second channels) of the first unit is given by $$\text{First Differential Signal} = N[Ip(t_0 - t_1) + Ib \cdot t_0] - \qquad (4)$$
$$N[Ip \cdot t_1 + Ib \cdot t_0]$$
$$= N \cdot Ip(t_0 - 2t_1)$$

which is identical to Eq. (3).

In contrast to this, as shown in FIGS. 4(a), 4(b), and 4(g) to 4(j), the first and second channels of the second unit represented by the character "B" attached to the reference numbers are alternately chosen by the switch 7B with the timing of the switching signals SW3 and SW4 having a pulse width $2t_0$ (shown in FIGS. 4(g) and 4(h)) which are synchronized with the emitted optical signal (shown in FIG. 4(a)). On the first channel (Cch) of the second unit, the first storage section 8c is provided, and as shown in FIG. 4(i), electric charges given by $$Ip(t_0) + Ib \cdot 2t_0$$

are stored in the third storage section 8c. Furthermore, on the second channel (Dch) of the second unit, the fourth storage section 8d is provided, and as shown in FIG. 4(j), electric charges given by $$Ib \cdot 2t_0$$

are stored in the fourth storage section 8d.

The outputs of the third and fourth storage sections 8c and 8d are input to the signal processing section 3, and the difference between the outputs is calculated by the second differential operation section 9B. A signal obtained by this differential operation can be expressed by the following Eq. (5).

$$\text{Second Differential Signal} = N[Ip(t_0) + Ib \cdot 2 \cdot t_0] - \tag{5}$$
$$N[Ib \cdot 2 \cdot t_0]$$
$$= N \cdot Ip(t_0)$$

As described above, the switching time related to the channels of the second unit is twice or more as long as the switching time related to the channels of the first unit, so that the result of a differential operation on the channels of the second unit depends on the intensity Ip of the reflected light because the switching time $t_0$ is known.

Assuming that the first differential signal is $S_1$ and the second differential signal is $S_2$, the distance (L) to the object 12 can be detected by obtaining the ratio between the results of the differential operations, $S_1/S_2$, by the distance determining section 10.

That is, $$S_1/S_2 = N \cdot Ip(t_0 - 2t_1)/N \cdot Ip(t_0) = (t_0 - 2t_1)/t_0$$
$$\therefore t_1 = \frac{t_0}{2} \cdot \left(1 - \frac{S_1}{S_2}\right)$$

is obtained, and the following Eq. (6) is derived to detect the distance (L).

$$L = \frac{c}{2} \cdot t_1 \tag{6}$$
$$= \frac{c}{2} \cdot \frac{t_0}{2} \cdot \left(1 - \frac{S_1}{S_2}\right) = \frac{c \cdot t_0}{4} \cdot \left(1 - \frac{S_1}{S_2}\right)$$

The switching time for the channels of the second unit is set to $2t_0$ as shown in FIG. 4 for simplicity. If the switching time for the channels of the second unit is at least twice as long as the switching time for the channels of the first unit, the whole of the reflected signal is included in a signal on the first channel of the second unit, thereby obtaining the same effect. However, if it is more than twice as long as the switching time for the channels of the first unit, the amount of stored electric charges based on the background light increases. Therefore, the switching time for the channels of the second unit is most preferably twice as long as the switching time for the channels of the first unit.

In the second embodiment as described, the first switching signals shown in FIG. 4(c) and 4(d) and the second switching signals shown in FIG. 4(g) and 4(h) drive the separate units. However, the same effect is obtained even in a single-unit configuration if the first switching signal is used in the first storage time period and the second switching signal is used in the second storage time period to perform measurement with a time difference. In this case, there is no difference whichever of the first and second switching signals is first used, and a distance value can be obtained by holding the result measured first using one of the first and second switching signals in a memory or a sample-and-hold circuit and subsequently performing a predetermined operation using the held result and the result measured using the other of first and second switching signals.

In FIG. 4, a pulse wave is used as the modulating signal applied to the light-emitting device. When the modulating signal is a pulse wave, the wave of the received light also becomes a pulse wave, and when the reflected signal light is received, the same received light intensity (constant value) is sustained, so that the amounts of stored signals vary in proportion to the distance (L) to the object 12, thereby having linearity over the full distance-measurable range. For this reason, the resolution can be constant over the full distance-measuring range. In contrast to this, when a triangular wave or a sawtooth wave is used as the modulating signal, the waveform of the received light is a linear function of time and thereby the storage amount becomes a quadratic function, so that there is roughness and fineness in resolution over the distance-measuring range. Thus, these waves should be used as appropriate in accordance with applications.

The above optical distance measuring apparatus has two units each having a photodetector, a switch, and a storage/differential operation section, so that the effect of the intensity of received light from the object 12 can be thus eliminated, thereby allowing accurate distance measurement.

Furthermore, the ratio between the outputs of the first and second units is calculated to determine the distance, so that the influence of the background light can be eliminated and the intensity of the received light from the object 12 can be normalized, thereby allowing accurate distance measurement.

Third Embodiment

Figure 5:
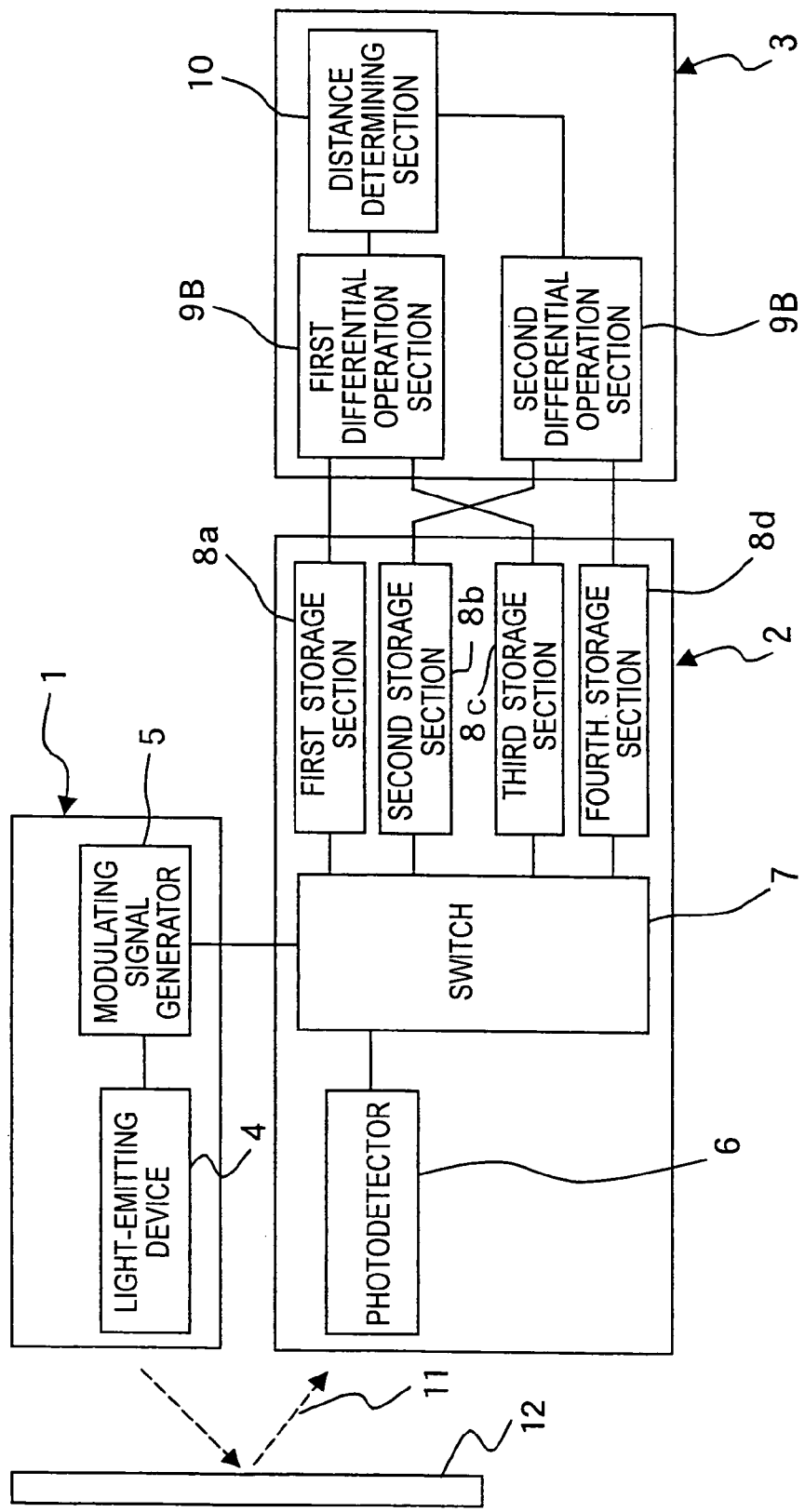
FIG. 5 is a block diagram of an optical distance measuring apparatus of a third example embodiment.
Figure 6:
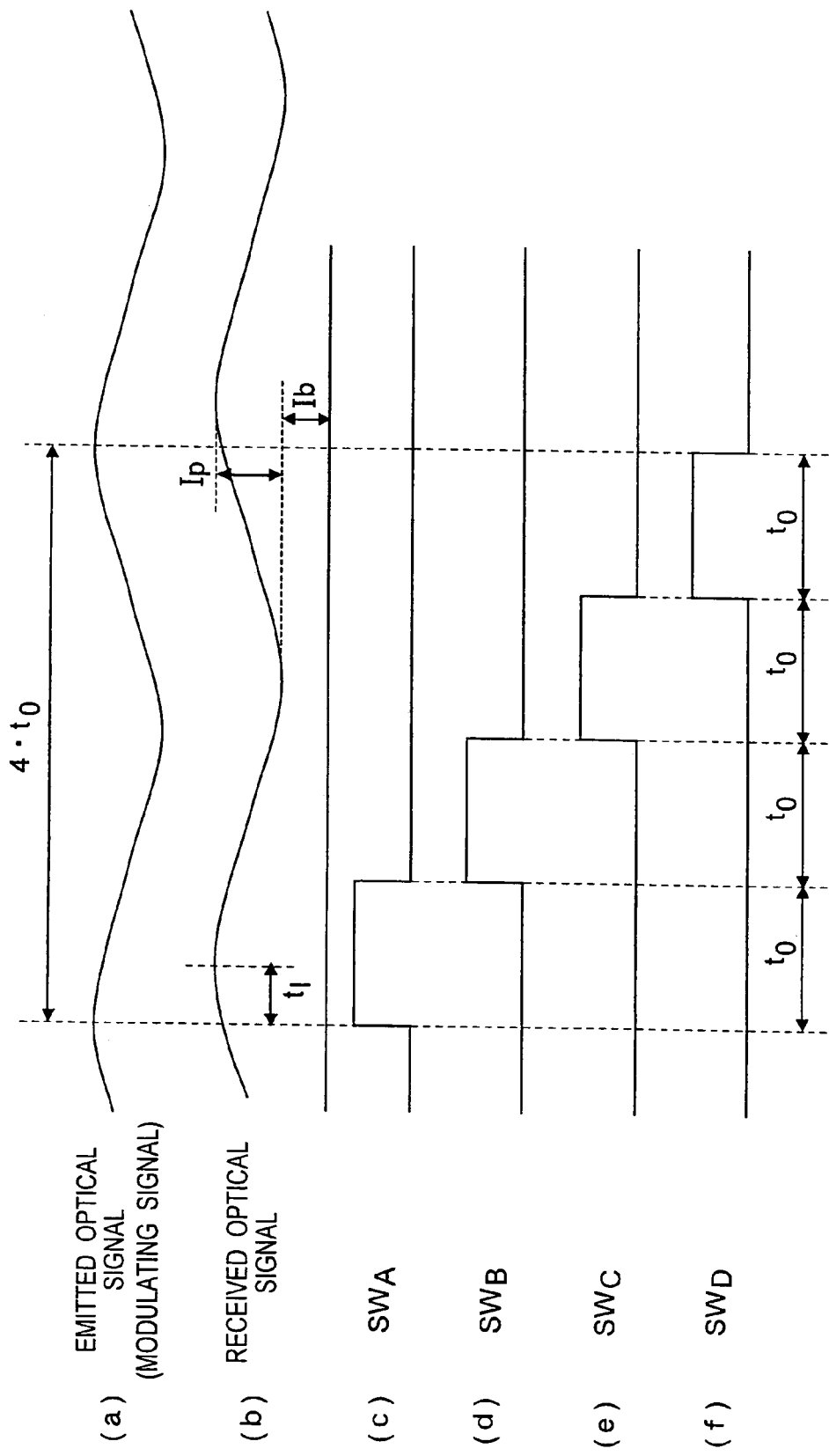
FIG. 6 is a timing chart depicting the operation of the optical distance measuring apparatus shown in FIG. 5.

Next, FIG. 5 shows a block diagram depicting the configuration of an optical distance measuring apparatus of a third example embodiment wherein the modulating signal is a sinusoidal wave, and its timing chart is shown in FIG. 6. In FIG. 5, same components as those in FIG. 1 are denoted by the same symbols.

This optical distance measuring apparatus has, as shown in FIG. 5, a transmitter 1 for emitting an optical beam 11 as an optical signal to an object 12 to be measured, a receiver 2 for receiving the optical beam 11 reflected by the object 12, and a signal processing section 3 for processing a signal from the receiver 2.

The transmitter 1 has a light-emitting device 4 for emitting an optical signal which is synchronized-with a modulating signal having a predetermined repetition frequency, and a modulating signal generator 5 for outputting a modulating signal to the light-emitting device 4.

The receiver 2 has a photodetector 6 for receiving an optical beam 11 reflected by the object 12 and converting it to an electrical signal, a switch 7 for receiving a signal from the modulating signal generator 5 to alternately choose four channels of an electrical signal from the photodetector 6 with a predetermined timing, and first to fourth storage sections 8a, 8b, 8c and 8d for storing electrical signals on the four channels, respectively, alternately chosen by the switch 7.

The switch 7 receives switching signals $SW_A$ to $SW_D$ from the modulating signal generator 5 to perform the switching operation.

Furthermore, the signal processing section 3 has a first differential operation section 9A for performing a differential operation on electrical signals stored in the first and third storage sections 8a and 8c, a second differential operation section 9B for performing a differential operation on electrical signals stored in the second and fourth storage sections 8b and 8d, and a distance determining section 10 for determining the distance to the object 12 on the basis of the results of the differential operations of the first and second differential operation section 9A and 9B.

The first to fourth storage sections 8a, 8b, 8c and 8d and the first and second differential operation sections 9A and 9B constitute a storage/differential operation section.

The emitted optical signal (modulating signal) of the light-emitting device 4 oscillates in a cycle of $4t_0$ as shown in FIG. 6(a), and the received optical signal is detected by the photodetector 6 with a phase delay by a time $t_1$ necessary for the light to travel the distance, L, to the object 12 and back. The signal detected by the photodetector 6 is transferred to the four channels alternately chosen by the switch 7 with the timings of the switching signals $SW_A$ to $SW_D$ (shown in FIGS. 6(c) to 6(f)), and is stored in the first to fourth storage sections 8a, 8b, 8c, and 8d. The durations of the four switching signals $SW_A$ to $SW_D$ shown in FIGS. 6(c) to 6(f) are any periods of time within a quarter ($t_0$) of the cycle of the sinusoidal wave of the modulating signal.

After the signal being divided into four signals and stored in the first to fourth storage sections 8a, 8b, 8c, and 8d, the first differential operation section 9A performs a differential operation on the signal stored in the first storage section 8a and the signal stored in the third storage section 8c, and the second differential operation section 9B performs a differential operation on the signal stored in the second storage section 8b and the signal stored in the fourth storage section 8d of the four signals. After each of the first and second differential operation sections 9A and 9B, a storage section (not shown) is provided by which a plurality of signal storage operations are performed. For both differential signals stored, the following processing is performed by the distance determining section 10, and the phase of the received optical signal can be thus obtained, and using the phase difference between the modulating signal (shown in FIG. 6(a)) and the received optical signal, the distance (L) to the object 12 can be obtained by the following Eq. (7).

$$L = \frac{t_0}{\pi} \cdot c \cdot \mathrm{Tan}^{-1}\left(\frac{S_D - S_B}{S_A - S_C}\right) \quad (7)$$

The process of deriving Eq. (7) will be described below. When the emitted light waveform and the received light waveform are expressed by the following arbitrary sinusoidal wave functions g(t) and f(t), respectively, $$g(t) = c \cdot \exp\{j(\omega t + \varphi)\} + d$$

$$f(t) = a \cdot \exp\{j(\omega t + \phi)\} + b$$

the phase difference between the emitted light waveform and the received light waveform is given by $\varphi - \phi$. In order to obtain this, the following computations are carried out.

In the received light waveform expressed by the function f(t), it is assumed that A is an integrated value for a first interval, B is an integrated value for a second interval, C is an integrated value for a third interval, and that D is an integrated value for a fourth interval. It is also assumed that the first to fourth intervals are shifted in phase by 90 degrees one after another. The integrated value A is then given by $$A = \int_{t_0 - \Delta t}^{t_0 + \Delta t} f(t) dt$$

$$= a \cdot \left[\frac{\exp\{j(\omega t + \phi)\}}{j\omega} + bt\right]_{t_0 - \Delta t}^{t_0 + \Delta t}$$

$$= a \cdot \frac{\exp\{j(\omega(t_0 + \Delta t) + \phi)\}}{j\omega} + b(t_0 + \Delta t) -$$

$$a \cdot \frac{\exp\{j(\omega(t_0 - \Delta t) + \phi)\}}{j\omega} - b(t_0 - \Delta t)$$

$$= -j\frac{a}{\omega} \cdot \exp\{j(\omega(t_0 + \Delta t) + \phi)\} +$$

$$j\frac{a}{\omega} \cdot \exp\{j(\omega(t_0 - \Delta t) + \phi)\} + 2b \cdot \Delta t$$

$$= -j\frac{a}{\omega} \cdot e^{j\omega\Delta t} \cdot \exp\{j(\omega t_0 + \phi)\} +$$

$$j\frac{a}{\omega} \cdot e^{-j\omega\Delta t} \cdot \exp\{j(\omega t_0 + \phi)\} + 2b \cdot \Delta t$$

$$= -j\frac{a}{\omega} \cdot e^{j\frac{\pi}{4}} \cdot \exp\{j(\omega t_0 + \phi)\} +$$

$$j\frac{a}{\omega} \cdot e^{-j\frac{\pi}{4}} \cdot \exp\{j(\omega t_0 + \phi)\} + 2b \cdot \Delta t$$

$$= \exp\{j(\omega t_0 + \phi)\}\frac{ja}{\omega}\left(-\frac{\sqrt{2}}{2}(1+j) + \frac{\sqrt{2}}{2}(1-j)\right) + 2b \cdot \Delta t$$

$$= \frac{ja}{\omega} \cdot \exp\{j(\omega t_0 + \phi)\}\frac{\sqrt{2}}{2}(-2j) + 2b \cdot \Delta t$$

$$= \sqrt{2} \frac{a}{\omega} \cdot \exp\{j(\omega t_0 + \phi)\} + 2b \cdot \Delta t$$

$$= A_0 + 2b \cdot \Delta t$$

Likewise, the integrated value B is given by $$B = \int_{t_1 - \Delta t}^{t_1 + \Delta t} f(t) dt$$

$$= \sqrt{2} \frac{a}{\omega} \cdot \exp\{j(\omega t_1 + \phi)\} + 2b \cdot \Delta t$$

where $t_1 = t_0 + \pi/4 = t_0 + \pi/(2\omega)$. This equation is thus expressed as $$B = \sqrt{2} \frac{a}{\omega} \cdot \exp\left\{j\left(\omega\left(t_0 + \frac{\pi}{2\omega}\right) + \phi\right)\right\} + 2b \cdot \Delta t$$

$$= \sqrt{2} \frac{a}{\omega} \cdot \exp\left\{j(\omega t_0 + \phi) + j\frac{\pi}{2}\right\} + 2b \cdot \Delta t$$

$$= \sqrt{2} \frac{a}{\omega} \cdot e^{j\frac{\pi}{2}} \cdot \exp\{j(\omega t_0 + \phi)\} + 2b \cdot \Delta t$$

$$= e^{j\frac{\pi}{2}} \cdot A_0 + 2b \cdot \Delta t$$

Furthermore, the integrated value C is given by $$C = \int_{t_2 - \Delta t}^{t_2 + \Delta t} f(t) dt$$

-continued $$= \sqrt{2}\frac{a}{\omega}\cdot \exp\{j(\omega t_2 + \phi)\} + 2b\cdot \Delta t$$

where $t_2 = t_0 + \pi/2 = t_0 + \pi/\omega$. This equation is thus expressed as $$C = \sqrt{2}\frac{a}{\omega}\cdot \exp\{j\omega t_0 + j\pi + j\phi\} + 2b\cdot \Delta t$$

$$= \sqrt{2}\frac{a}{\omega}\cdot e^{j\pi}\cdot \exp\{j\omega t_0 + j\phi\} + 2b\cdot \Delta t$$

$$= e^{j\pi}\cdot A_0 + 2b\cdot \Delta t$$

Furthermore, the integrated value D is given by $$D = \int_{t_3 - \Delta t}^{t_3 + \Delta t} f(t)dt$$

$$= \sqrt{2}\frac{a}{\omega}\cdot \exp\{j(\omega t_3 + \phi)\} + 2b\cdot \Delta t$$

where $t_3 = t_0 + 3\pi/2 = t_0 + 3\pi/(2\omega)$. This equation is thus expressed as $$D = \sqrt{2}\frac{a}{\omega}\cdot \exp\left\{j\omega t_0 + j\frac{3}{2}\pi + j\phi\right\} + 2b\cdot \Delta t$$

$$= \sqrt{2}\frac{a}{\omega}\cdot e^{j\frac{3}{2}\pi}\cdot \exp\{j\omega t_0 + j\phi\} + 2b\cdot \Delta t$$

$$= e^{j\frac{3}{2}\pi}\cdot A_0 + 2b\cdot \Delta t$$

Consequently, $$A - C = A_0 - A_0 \cdot e^{j\pi}$$

$$= A_0(1 - e^{j\pi})$$

$$= 2A_0$$

$$= 2\sqrt{2}\frac{a}{\omega}\cdot \exp\{j(\omega t_0 + \phi)\}$$

$$D - B = A_0\left(e^{j\frac{3}{2}\pi} - e^{j\frac{\pi}{2}}\right)$$

$$= A_0(-j - j)$$

$$= -2jA_0$$

$$= 2\sqrt{2}\frac{a}{\omega}j\cdot \exp\{j(\omega t_0 + \phi)\}$$

$$= 2\sqrt{2}\frac{a}{\omega}\cdot \exp\left\{j\left(\omega t_0 + \phi - \frac{\pi}{2}\right)\right\}$$

are given. From these equations, $$\left|\frac{D-B}{A-C}\right| = \left|\frac{\exp\left\{j\left(\omega t_0 + \phi - \frac{\pi}{2}\right)\right\}}{\exp\{j(\omega t_0 + \phi)\}}\right| = \frac{\cos\left(\omega t_0 + \phi - \frac{\pi}{2}\right)}{\cos(\omega t_0 + \phi)}$$

$$= \frac{\sin(\omega t_0 + \phi)}{\cos(\omega t_0 + \phi)} = \tan(\omega t_0 + \phi)$$

is given, and then $$\omega t_0 + \phi = \mathrm{Tan}^{-1}\left(\frac{D-B}{A-C}\right)$$

is obtained.

When the relation between $t_0$ and $\phi$ is fixed in such a manner that the output of the emitted light waveform at $t_0$ is $$\omega t_0 + \psi = n\cdot 2\pi/\omega (n = 0, 1, 2, \ldots),$$

then, $$-\phi + \phi + n\cdot \frac{2\pi}{\omega} = -\phi + \phi = \mathrm{Tan}^{-1}\left(\frac{D-B}{A-C}\right)$$

is given, and in particular when $\phi = 0$, $$\phi = \mathrm{Tan}^{-1}\left(\frac{D-B}{A-C}\right)$$

is given. $\Delta t$ in Eq. (1) is given by $$\Delta t = \frac{2t_0\phi}{\pi} = \frac{2t_0}{\pi}\cdot \mathrm{Tan}^{-1}\left(\frac{D-B}{A-C}\right)$$

which is substituted in Eq. (1) to derive Eq. (7)

When a sinusoidal wave is used for the modulating signal, a photodetector 6, a switch 7 for alternating choose the first to fourth storage sections 8a, 8b, 8c, and 8d by four switching signals which are shifted by 90 degrees in phase one after another, a differential operation section for the first storage section 8a and the third storage section 8c, and a differential operation section for the second storage section 8b and the fourth storage section 8d may be provided, and measured values necessary for a distance operation can be obtained with a single photodetector 6. FIG. 6 shows an example of modulation by a sinusoidal wave as a continuous wave. However, even if the emitted optical signal is modulated by a sinusoidal wave with one or more cycles generated intermittently, similar effects can be obtained.

The signals $S_1$, $S_2$, and $S_A$ to $S_D$ shown in Eq. (6) or (7) are represented as amounts of electric charges. In general, when a signal is detected, it is converted to a voltage and is read. The amount of stored electric charge Q has the following relation with the capacitance C and the voltage V.

$$Q = CV \tag{8}$$

Thus, the signal amounts indicated by $S_1$, $S_2$, and $S_A$ to $S_D$ in Eq. (6) or (7) are as follows when treated as electric potentials.

$$V = Q/C = S/C \tag{9}$$

When Eq. (6) is rewritten using Eq. (9), $$L = \frac{c \cdot t_0}{4} \cdot \left(1 - \frac{C_2 V_1}{C_1 V_2}\right) \quad (10)$$

is obtained. When Eq. (7) is rewritten in a like manner, $$L = \frac{t_0}{\pi} \cdot c \cdot \text{Tan}^{-1}\left(\frac{C_2 V_1}{C_1 V_2}\right) \quad (11)$$

is obtained.

In Eqs. (10) and (11), C1 and C2 are the capacitances of capacitive elements provided after the differential operation sections on the channels of the first and second units, respectively. As shown in FIG. 10 or 11, when the capacitance values of both capacitive elements are equal, the capacitance values are normalized to have no influence on the result of the operation. For this reason, it is preferable that the capacitive elements have equal capacitance values.

Furthermore, it is preferred that the first unit and the second unit have the same characteristic, thus preferably being integrated on the same semiconductor substrate.

In the optical distance measuring apparatus configured as above, the storage sections are prevented from being saturated with noise components even under an environment such as the outdoors where background light is very strong, so that the transit time of the light is detected from sufficient signal components, thereby allowing a high-precision distance operation.

Outline of signal processing methods and configurations for eliminating the influence of background light has been described above. Specific examples of the configurations will be described next in detail according to the following fourth to eighth embodiments.

Fourth Embodiment

Figure 7:
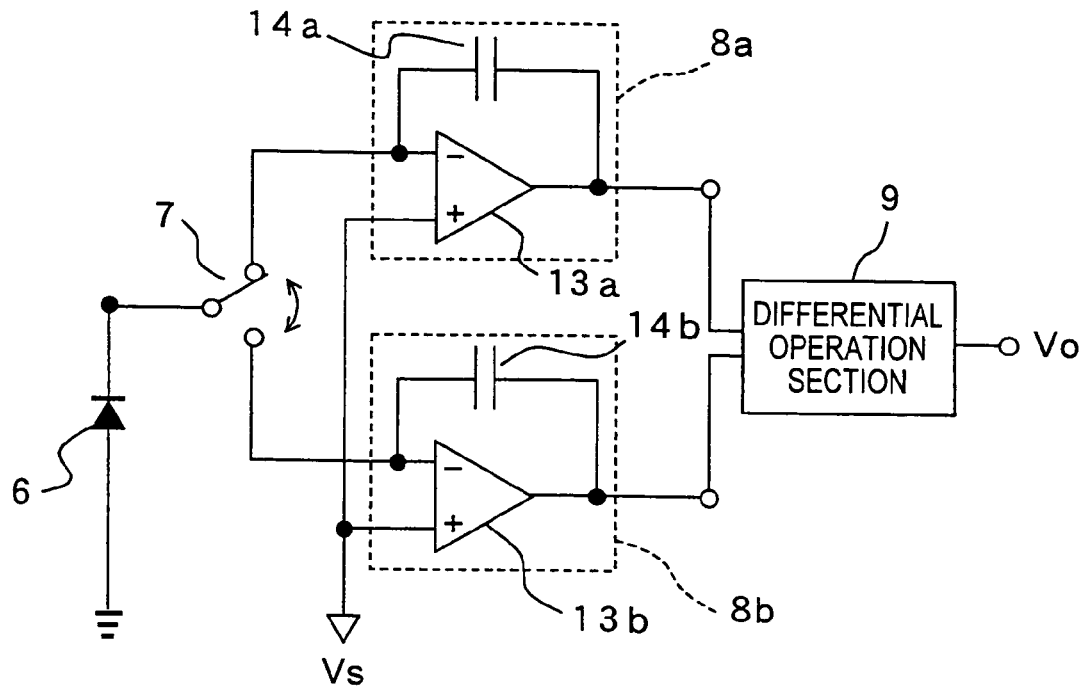
FIG. 7 is a circuit diagram showing part of an optical distance measuring apparatus of a fourth example embodiment.

FIG. 7 is a circuit diagram of an optical distance measuring apparatus of a fourth example embodiment. The configuration of the fourth example embodiment will be described with reference to FIG. 7. FIG. 7 shows part of the receiver 2 and the signal processing section 3 shown in FIGS. 1, 3 and 5, in which the photodetector 6, the first and second storage sections 8a and 8b, and the differential operation section 9 constitute a "unit". An optical distance measuring apparatus uses one or two sets (namely, a first unit and a second unit) of the circuit in FIG. 7. Circuits which are equivalent in effect to that in FIG. 7, but are different in configuration from it will be described in the subsequent embodiments. Those circuits may be used in combination so as to be able to realize the functions described above, although description about such combinations is omitted in the following embodiments.

As shown in FIG. 7, the cathode of the photodetector 6, the anode of which is connected with the ground, is connected with the input terminal of the switch 7. One of the output terminals of the switch 7 is connected with the inverse input terminal of an operational amplifier 13a, and a capacitive element 14a is connected between the output terminal and inverse input terminal of the operational amplifier 13a. Furthermore, the other output terminal of the switch 7 is connected with the inverse input terminal of another operational amplifier 13b, and a capacitive element 14b is connected between the output terminal and inverse input terminal of the operational amplifier 13b. The non-inverse input terminals of the operational amplifiers 13a and 13b are connected with a reference electric potential Vs. The output terminals of the operational amplifiers 13a and 13b are connected with the differential operation section 9, and an output voltage Vo is output from the output terminal of the differential operation section 9.

In FIG. 7, an optical signal detected by the photodetector 6 is transferred alternately to the first channel and the second channel with a timing shown in FIG. 2, 4, or 6 by the switch 7. In FIG. 7, an upper channel is referred to as the first channel, and a lower channel is referred to as the second channel. On the first channel, an integrator constituted by the operational amplifier 13a and the capacitive element 14a is provided, and on the second channel, an integrator constituted by the operational amplifier 13b and the capacitive element 14b is provided, with signals detected by the photodetector 6 being stored in the integrators. These integrators are the first and second storage sections 8a and 8b shown in FIGS. 1, 3, and 5. The first and second storage sections 8a and 8b store a predetermined number of signals detected over a plurality of cycles of the modulating signal. The first and second storage sections 8a and 8b enter signals represented by Eq. (3), etc. into the differential operation section 9.

Using capacitive elements 14a, 14b as the storage sections, high-speed responsive integrators can be easily constituted, and therefore divided electric charges can be stored in an appropriate manner.

Furthermore, inputs to the integrators are electric currents (amounts of electric charges), while outputs of the integrators are voltages, and therefore the differential operation section 9 is also configured so as to process voltages. For this reason, if the capacitance value of the capacitive element 14a of the first integrator 8a is set to $C_1$ and the capacitance value of the capacitive element 14b of the second integrator 8b is set to $C_2$, referring to Eq. (8), and if the timing in FIG. 2 is taken as an example, outputs of the first and second integrators Ba and 8b are given by the following equations.

$$\text{Output of First Integrator} = N \cdot \frac{Ip(t_0 - t_1) + Ib \cdot t_0}{C_1} \quad (12A)$$

$$\text{Output of Second Integrator} = N \cdot \frac{Ip \cdot t_1 + Ib \cdot t_0}{C_2} \quad (12B)$$

As indicated in Eqs. (12A) and (12B), if the capacitance values of the capacitive elements 14a, 14b of the first and second integrators 8a, 8b are different from each other, the result of the differential operation has a certain offset. Since the distance is determined using the result of the differential operation, existence of an offset electric potential becomes a factor causing an error, and is thus undesired.

For this reason, the capacitive elements 14a, 14b of the first and second integrators 8a, 8b have the same capacitance value. In addition, the difference between the characteristics of the integrators also becomes a factor causing an error. However, these integrators are made in a similar structure on the same semiconductor substrate, thereby ideally reducing an error which would be caused by the difference in characteristics. In this case, C1=C2, so that the output voltage Vo in FIG. 7 is given by $$V_o = \frac{N}{C} \cdot Ip(t_0 - 2t_1) \quad (13)$$

which is equivalent to the output expressed by Eq. (3). By changing the timing of switching as shown in FIG. 4 or 6, respective effects can be obtained using the configuration of FIG. 7. Description about this is omitted because of duplication. It should be understood that also in the following embodiments, respective results of differential operations can be obtained similarly by changing the timing of switching in respective configurations. Description about this will be omitted in the following embodiments.

According to the configuration of the fourth embodiment, electric charges based on both the signal light and the background light are simultaneously stored in each of the integrators. For this reason, under an environment where background light is strong, although the result of the differential operation is not affected by the background light, the outputs of the integrators are strongly affected by the background light. In other words, the magnitude of the output of the differential operation section 9 is significantly dependent on the intensity of the background light, so that it is necessary to increase the capacitance values of the capacitive elements used for the integrators. However, when the capacitance values are increased, the responses of the integrators become slow. Consequently it is difficult to increase the accuracy of distance measurement. Configurations for solving such a problem will be shown in the following embodiments.

Fifth Embodiment

Figure 8:
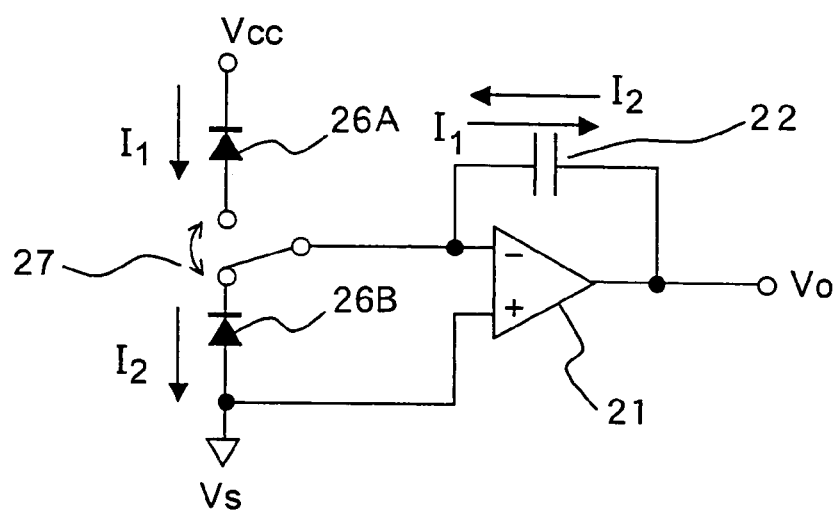
FIG. 8 is a circuit diagram showing part of an optical distance measuring apparatus of a fifth example embodiment.

FIG. 8 is a circuit diagram of an optical distance measuring apparatus of a fifth example embodiment. The configuration of the fifth example embodiment will be described with reference to FIG. 8.

As shown in FIG. 8, the anode of a first photodetector 26A, the cathode of which is applied with a power supply voltage, Vcc, is connected with one of the input terminals of a switch 27, and the cathode of a second photodetector 26B, the anode of which is connected with the ground, is connected with the other of the input terminals of the switch 27. The output terminal of the switch 27 is connected with the inverse input terminal of an operational amplifier 21, and a capacitive element 22 is connected between the output terminal and inverse input terminal of the operational amplifier 21. The non-inverse input terminal of the operational amplifier 21 is connected with the reference electric potential, Vs. An output voltage $V_o$ is output from the output terminal of the operational amplifier 21.

In FIG. 8, the upper photodetector is referred to as the first photodetector 26A, and the lower photodetector is referred to as the second photodetector 26B. Onto the light receiving surfaces of the first and second photodetectors 26A and 26B, signal light is applied evenly by a suitable optical system. The switch 27 is alternately flipped to the anode of the first photodetector 26A and the cathode of the second photodetector with a timing shown in FIGS. 2, 4, or 6. The photoelectric current of a photodetector chosen by the switch 27 is stored in an integrator having the same configuration as in the fourth embodiment. Since the switch 27 is alternately flipped to the anode terminal of the first photodetector 26A and the cathode terminal of the second photodetector 26B, when the first photodetector 26A has been chosen by the switch 27, the photoelectric current $I_1$ acts in the direction in which it flows into the integrator, and when the second photodetector 26B has been chosen by the switch 27, the photoelectric current $I_2$ acts in the direction in which it flows out of the integrator. Since the reflected light is evenly applied to the first and second photodetectors 26A and 26B, the values of the photoelectric currents of the first and second photodetectors 26A and 26B are equal. Using the magnitude Ip of the photoelectric currents, the first and second photoelectric currents $I_1$ and $I_2$ may be indicated as follows.

$$I_1 = Ip \cdot f(t) \quad (14A)$$

$$I_2 = Ip \cdot g(t) \quad (14B)$$

where f(t) and g(t) represent the waveforms (functions of time) of $I_1$ and $I_2$, respectively. Thus, the output ($V_o$) of the integrator is given by $$V_o = \frac{N}{C}\left(\int_0^{t1} I_2(t)dt - \int_{t2}^{t3} I_1(t)dt\right) \quad (15)$$

Since each of the photodetectors is chosen by the switch 27 for the same duration ($t_0$) in FIGS. 2, 4, or 6, Eq. (15) may be rewritten as follows.

$$V_o = \frac{N}{C}\left(\int_0^{t0}\{I_2 - I_1\}dt\right) \quad (16)$$

$$= \frac{N \cdot Ip}{C}\int_0^{t0}\{f(t) - g(t)\}dt$$

As described above, according to an optical distance measuring apparatus of a fifth embodiment, the integrator (21,22) using the capacitive element 22 stores electrical signals on the two channels while performing a differential operation, so that the number of components can be reduced and the error of the differential operation can be ideally eliminated, thereby allowing higher-precision distance measurement.

Furthermore, the direction of a current which acts on the integrator 21 plus 22 is reversed with a predetermined timing by the switch 27, thereby obtaining the effect of a differential operation. Thus, the single integrator is able to perform a differential operation while storing a signal component which is the result of the differential operation.

Furthermore, in the configuration of FIG. 8, because the direction of a current which acts on the integrator is inversed by the switch 27, so that a differential operation is implemented by the single integrator, there is no capacitance difference and characteristic difference in integrator as in the case that two integrators are provided.

Sixth Embodiment

Figure 9:
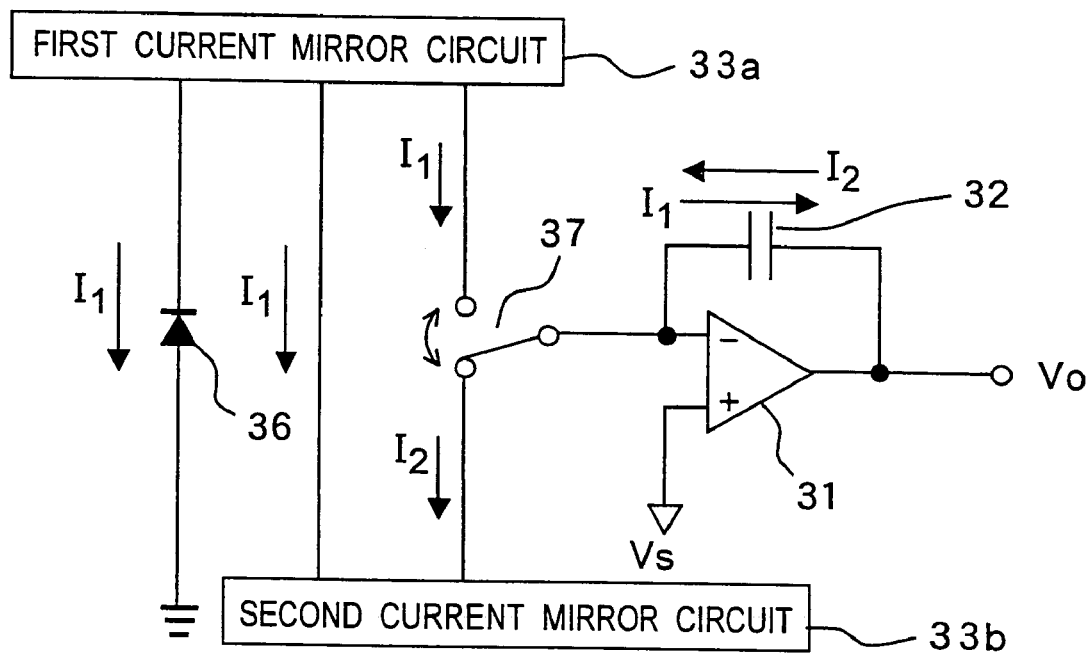
FIG. 9 is a circuit diagram showing part of an optical distance measuring apparatus of a sixth example embodiment.

FIG. 9 is a circuit diagram of an optical distance measuring apparatus of a sixth example embodiment. The configuration of the sixth example embodiment will be described with reference to FIG. 9. In FIG. 9, there are shown a first current mirror circuit 33a that is a current-discharging type current mirror circuit provided with one input-side terminal and two output-side terminals through which a current having the same value as a current flowing through the input-side terminal flows, and a second current mirror circuit 33b that is a current-absorbing type current mirror circuit provided with one input-side terminal and one output-side terminal through which a current having the same value as a current flowing through the input-side terminal flows.

As shown in FIG. 9, the cathode of a photodetector 36, the anode of which is connected with the ground, is connected with the input-side terminal of the first current mirror circuit 33a. One of the output-side terminals of the first current mirror circuit 33a is connected with the input-side terminal of the second current mirror circuit 33b, the other of the output-side terminals of the first current mirror circuit 33a is connected with one of the input terminals of a switch 37, and the other of the input terminals of the switch 37 is connected with the output-side terminal of the second current mirror circuit 33b. The output terminal of the switch 37 is connected with the inverse input terminal of an operational amplifier 31, and a capacitive element 32 is connected between the output terminal and inverse input terminal of the operational amplifier 31. The non-inverse input terminal of the operational amplifier 31 is connected with the reference electric potential Vs. An output voltage Vo is output from the output terminal of the operational amplifier 31.

Referring to FIG. 9, the current-discharging type first current mirror circuit 33a produces two current signals $I_1$ having the same current value from a photoelectric current $I_1$ detected by the photodetector 36. One of the two current signals $I_1$ flows into one of the terminals of the switch 37, and the other of the two current signals $I_1$ flows directly into the current-absorbing type second current mirror circuit 33b, which absorbs a current signal $I_2$ from the switch 37. Since the photoelectric current is replicated by the first and second current mirror circuits 33a and 33b, $I_1$ and $I_2$ have the same magnitude, Ip, and since the direction of a current which acts on the integrator is reversed as shown in the figure by the switch 37, the output, Vo, of the integrator can be indicated as Eq. (16) as in the case of the fifth embodiment.

As described above, in the optical distance measuring apparatus of the sixth embodiment, the integrator 31 plus 32 having the capacitive element 32 stores electrical signals on the two channels while performing a differential operation, so that the number of components can be reduced and the error of the differential operation can be ideally eliminated, thereby allowing higher-precision distance measurement.

Furthermore, the direction of a current which acts on the integrator 31 plus 32 is reversed with a predetermined timing by the switch 37, thereby obtaining the effect of a differential operation. Thus, the single integrator is able to store perform a differential operation while storing signal components which are the result of the operation.

In the sixth embodiment, a single integrator and a single photodetector are used. Therefore, there is neither a problem of a characteristic difference between integrators which may be caused in the case of the fourth embodiment, nor a problem of an output difference between photodetectors due to unevenness in application of light or the like which may be caused in the case of the fifth embodiment.

Seventh Embodiment

Figure 10A:
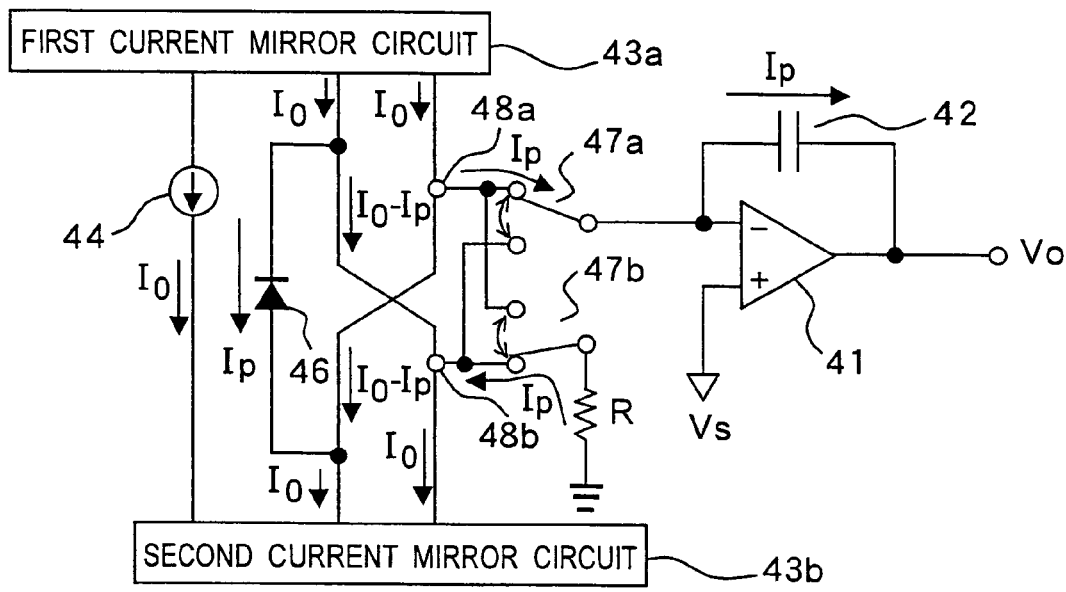
FIG. 10A is a circuit diagram showing part of an optical distance measuring apparatus of a seventh example embodiment.

FIG. 10A is a circuit diagram of an optical distance measuring apparatus of a seventh example embodiment. The configuration of the seventh example embodiment will be described with reference to FIG. 10A. In FIG. 10A, there are shown a first current mirror circuit 43a that is a current-discharging type current mirror circuit provided with one input-side terminal and two output-side terminals through which a current having the same value as a current flowing through the input-side terminal flows, and a second current mirror circuit 43b that is a current-absorbing type current mirror circuit provided with one input-side terminal and two output-side terminals through which a current having the same value as a current flowing through the input-side terminal flows.

As shown in FIG. 10A, the negative electrode of a constant current source 44 is connected with the input-side terminal of the first current mirror circuit 43a, and the positive electrode of the constant current source 44 is connected with the input-side terminal of the second current mirror circuit 43b. The cathode of a photodetector 46 is connected with one of the output-side terminals of the first current mirror circuit 43a. The anode of the photodetector 46 is connected with one of the output-side terminals of the second current mirror circuit 43b, and the one of the output-side terminals of the second current mirror circuit 43b is also connected with the other of the output-side terminals of the first current mirror circuit 43a. The one of the output-side terminals of the first current mirror circuit 43a is also connected with the other of the output-side terminals of the second current mirror circuit 43b. A first output terminal 48a connected with the other of the output-side terminals of the first current mirror circuit 43a is connected with one of the input terminals of a switch 47a and one of the input terminals of a switch 47b. A second output terminal 48b connected with the one of the output-side terminals of the first current mirror circuit 43a is connected with the other of the input terminals of the switch 47a and the other of the input terminals of the switch 47b. The output terminal of the switch 47a is connected with the inverse input terminal of an operational amplifier 41, and a capacitive element 42 is connected between the output terminal and inverse input terminal of the operational amplifier 41. The non-inverse input terminal of the operational amplifier 41 is connected with the reference electric potential Vs. An output voltage Vo is output from the output terminal of the operational amplifier 41.

In FIG. 10A, the constant current source 44 supplies a constant DC current $I_0$ to the current-discharging type first current mirror circuit 43a and the current-absorbing type second current mirror circuit 43b. The first and second output terminals 48a and 48b connected with the output-side terminals of the first current mirror circuit 43a are connected to the integrator 41 plus 42 at a later stage with predetermined timing (see FIGS. 2, 4, or 6) by the switch 47a. A channel between the other of the output-side terminals of the first current mirror circuit 43a and the one of the output-side terminals of the second current mirror circuit 43b is referred to as the first channel, while a channel between the one of the output-side terminals of the first current mirror circuit 43a and the other of the output-side terminals of the second current mirror circuit 43b is referred to as the second channel.

Furthermore, in the operational state of the switches 47a and 47b shown in FIG. 10A, the first output terminal 48a is connected with the integrator 41 plus 42, while the second output terminal 48a is grounded through a resistor R as an example of a load resistor. In contrast, in the operational state of the switches 47a and 47b shown in FIG. 10B, the second output terminal 48b is connected with the integrator 41, 42, while the first output terminal 48a is grounded through the resistance R. The configuration of the integrator 41, 42 is the same as the first to sixth embodiments.

Since both of the first and second channels are directly connected with the current mirror circuits, a photoelectric current produced by the photodetector 46 appears on the first and second output terminals 48a and 48b in the form of a difference between the current of the constant current source 44 and the photoelectric current. For example, in the operational state of the switches 47a and 47b shown in FIG. 10A, when a photoelectric current Ip is produced by the photodetector 46, the current Ip is separated, at the cathode of the photodetector 46, from a current Io which has flowed out from the one of the output terminals of the first current mirror circuit 43a to the first channel, and the current of ($I_0$–Ip) flows to the other of the output terminals of the second current mirror circuit 43b. However, since the input-side terminal of the second current mirror circuit 43b is connected with the constant current source 44, the current $I_0$ is always absorbed to the other of the output terminals of the second mirror circuit 43b, so that a current corresponding to the photoelectric current Ip flows to the second output terminal 48b on the second channel through the resistor R. Likewise, the current Ip is separated, at the first output terminal 48a, from the current $I_0$ which has flew out from the other of the output terminals of the first current mirror circuit 43a to the second channel, and the current of ($I_0$–Ip) flows to the one of the output terminals of the second current mirror circuit 43b, while a current corresponding to the photoelectric current Ip flows to the inverse input terminal of the operational amplifier 41 through the first output terminal 48a.

Figure 10B:
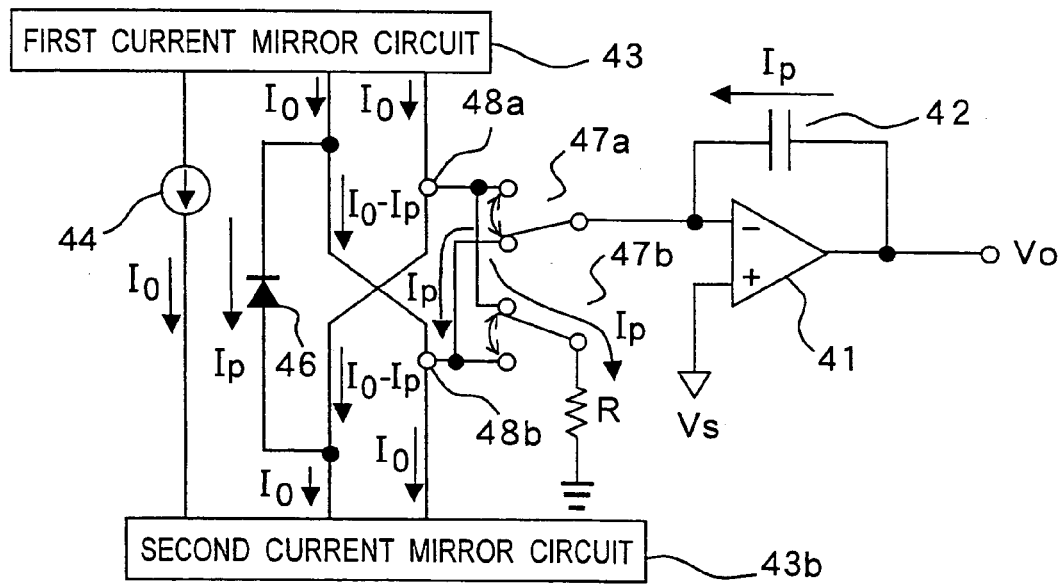
FIG. 10B is a circuit diagram depicting the operation of the optical distance measuring apparatus shown in FIG. 10A.

In contrast to this, in the operational state of the switches 47a and 47b shown in FIG. 10B, when a photoelectric current Ip is produced by the photodetector 46, the current Ip is separated, at the cathode of the photodetector 46, from the current $I_0$ which has flowed out from the one of the output terminals of the first current mirror circuit 43a to the first channel, and the current of ($I_0$–Ip) flows to the other of the output terminals of the second current mirror circuit 43b. However, since the input-side terminal of the second current mirror circuit 43b is connected with the constant current source 44, the current $I_0$ is always absorbed to the other of the output terminals of the second mirror circuit 43b, so that a current corresponding to the photoelectric current Ip flows from the inverse input terminal side of the operational amplifier 41 to the second output terminal 48b on the second channel. Likewise, the current Ip is separated, at the first output terminal 48a, from a current $I_0$ which has flew out from the other of the output-side terminals of the first current mirror circuit 43a to the second channel, and the current of ($I_0$–Ip) flows to the one of the output terminals of the second current mirror circuit 43b, while a current corresponding to the photoelectric current Ip flows out to the ground through the first output terminal 48a and the resistor R.

Since the direction of a current which acts on the integrator 41 plus 42 can be reversed by an operation of the switches 47a and 47b in this way, the output, Vo, of the integrator can be expressed by Eq. (16) as in the case of the fifth embodiment and the sixth embodiment.

As described above, in the optical distance measuring apparatus of the seventh embodiment, the integrator 41, 42 using a capacitive element 42 performs a differential operation while storing electrical signals of the two channels, so that the number of components can be reduced and the error of the differential operation can be ideally eliminated, thereby allowing higher-precision distance measurement.

Furthermore, the direction of a current which act on the integrator 41, 42 is reversed with a predetermined timing by switching operations of the switches 47a and 47b, so that the effect of a differential operation can be obtained. Thus, the single integrator is able to perform a differential operation while storing signal components which are the result of the differential operation.

The seventh embodiment is able to provide an effect similar to that of the sixth embodiment, and to provide a higher speed response as compared with the sixth embodiment because the constant current source 44 is always supplying a current $I_0$ so that an input impedance of the photodetector 46 can be reduced. As a result, it is possible to increase the accuracy of distance measurement significantly.

Eighth Embodiment

FIG. 11A is a cross-sectional view of a main part of the receiver of an optical distance measuring apparatus of an eighth example embodiment, and FIG. 11B shows a potential distribution taken along the line XIB-XIB in FIG. 11A. The configuration of the eighth example embodiment will be described below with reference to FIGS. 11A and 11B.

In FIG. 11A, surrounded with a dotted line is the main part of the receiver having the functions of a photodetector, switch, and storage section. A p-type semiconductor substrate 58 is formed with a first n-type diffusion layer which serves as a light-receiving section 56 as an example of a photodetector, and second n-type diffusion layers which serves as first and second storage sections 50a and 50b. The second n-type diffusion layers are formed at predetermined intervals on both sides of the light-receiving section 56. Furthermore, between the light-receiving section 56 and the first storage section 50a, and between the light receiving section 56 and the second storage section 50b, gates 51a and 51b as examples of first and second switches are formed, respectively, by gate oxide films and electrodes on the p-type semiconductor substrate 58. The light-receiving section 56, storage sections 50a and 50b, and gates 51a and 51b are bilaterally symmetric in cross section with respect to the center line CL of the light-receiving section 56, and are symmetric also with respect to a plane perpendicular to the paper face including the center line CL.

At a stage after the first and second storage sections 50a and 50b formed from the second n-type diffusion layer, there is a differential operation section 59, which outputs a difference, Vo, between signals detected by the first and second storage sections 50a and 50b. The first and second storage sections and the differential operation section 59 constitute a storage/differential operation section.

Furthermore, as described above, FIG. 11B shows a potential distribution taken along the line XIB-XIB in FIG. 11A. In FIG. 11B, hv represents the energy of one photon (h is Planck's constant, and ν is the frequency of light).

As shown in FIG. 11B, the potential of the portion under the gate 51a increases by applying an electric potential to the gate 51a, whereby the optical carriers in the light-receiving section 56 move to the left side of the figure along the potential steps, and then are stored in the first storage section 50a which is a storage section having the highest electric potential. The gates 51a and 51b correspond to the switches depicted in FIGS. 2, 4, or 6. By choosing the gates 51a and 51b alternately with timing as shown in FIGS. 2, 4, or 6 in an appropriate manner, the optical carriers are divided between the first and second storage sections. The carriers stored in each of the first storage section 50a and the second storage section 50b are detected as an electric potential corresponding to the amount of stored electric charges as indicated by Eq. (8) when the storage capacitance of each storage section is C. The differential operation section 59 outputs, in a form indicated by Eq. (4), (5), or the like, the results of differential operations on electric potentials corresponding to the amounts of electric charges stored in the first and second storage sections 50a and 50b. Subsequent processes are as described above, thus being omitted here. The first and second storage sections 50a and 50b each function like an integrator.

The optical carriers generated in the light-receiving section 56 are divided right and left by the gates 51a and 51b, and therefore if there is a difference between the right movement and left movement of carriers generated in the light-receiving section 56, the first term and second term of Eq. (3), (4), or (5) are changed, so that not only the background light component cannot be appropriately eliminated, but also does improper distance measurement result. For this reason, the light-receiving section 56, the first and second storage sections 50a and 50b, and the gates 51a and 51b are made bilaterally symmetric in order that the optical carriers generated in the light-receiving section 56 are evenly divided right and left.

In the optical distance measuring apparatus of the eighth embodiment, because the light-receiving section 56, the gates 51a and 51b, and the first and second storage sections 50a and 50b are bilaterally symmetric with respect to the center axis of the photodetector, electric charges are evenly stored in the first and second storage sections 50a and 50b, thereby improving the accuracy of distance measurement and effectively eliminating background light by a differential operation.

In the above first to eighth example embodiments, in order that the optical distance measuring apparatuses as described above have a resolution of the order of centimeters in the distance-measuring range of several meters, a light-emitting device capable of responding to a modulating signal having a pulse width of the order of several tens of nanoseconds, in other word, a frequency of the order of MHz or more is required. An LED or LD is capable of such a high-speed response, and is compact and able to be manufactured at low cost, thus being suitable as a light-emitting device of the optical distance measuring apparatus. An LED (light-emitting diode) is suitable for measurement of a relatively short distance because its luminous flux diffuses, and an LD (laser diode) is suitable for measurement of a long distance because it is able to emit collimated light and apply an optical beam to a far object at a high density of energy. However, uses of an LED and an LD are not always so separated. For example, in an optical distance measuring apparatus to which a measure to eliminate background light is taken, it is preferred that the signal light is as strong as possible when the apparatus is used outdoors in the daytime in order to increase the SN ratio, and in such a case an LD may be preferable to an LED in measurement of a short distance.

In addition, by using a scanning mechanism for scanning one-dimensionally with an optical beam emitted from the light-emitting device, it becomes possible to obtain a two-dimensional image using the scan angle of the scanning mechanism and the value of distance measured. Likewise, by using a scanning mechanism for scanning two-dimensionally with an optical beam, it becomes possible to obtain a three-dimensional distance image.

Ninth Embodiment

Figure 12:
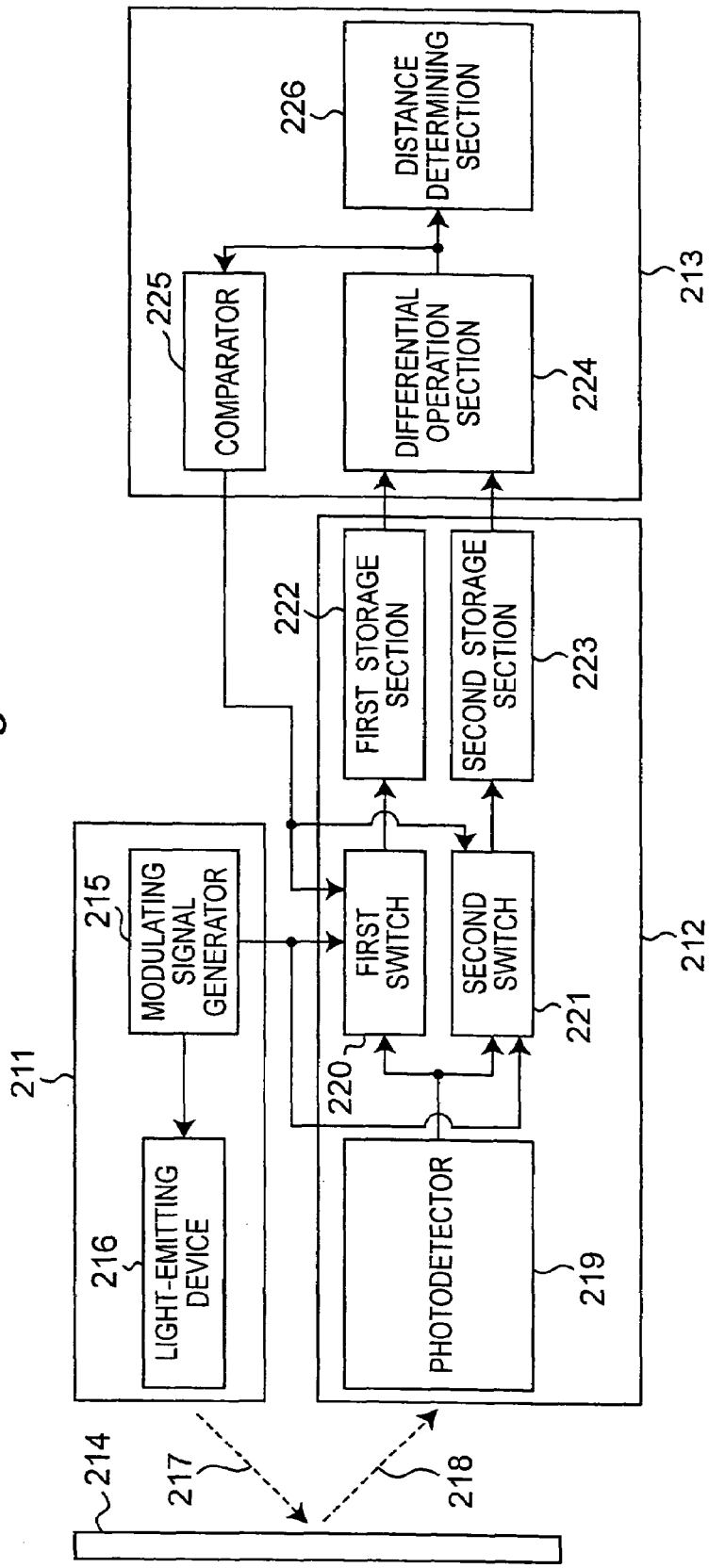
FIG. 12 is a block diagram of an optical distance measuring apparatus of a ninth example embodiment.
Figure 13:
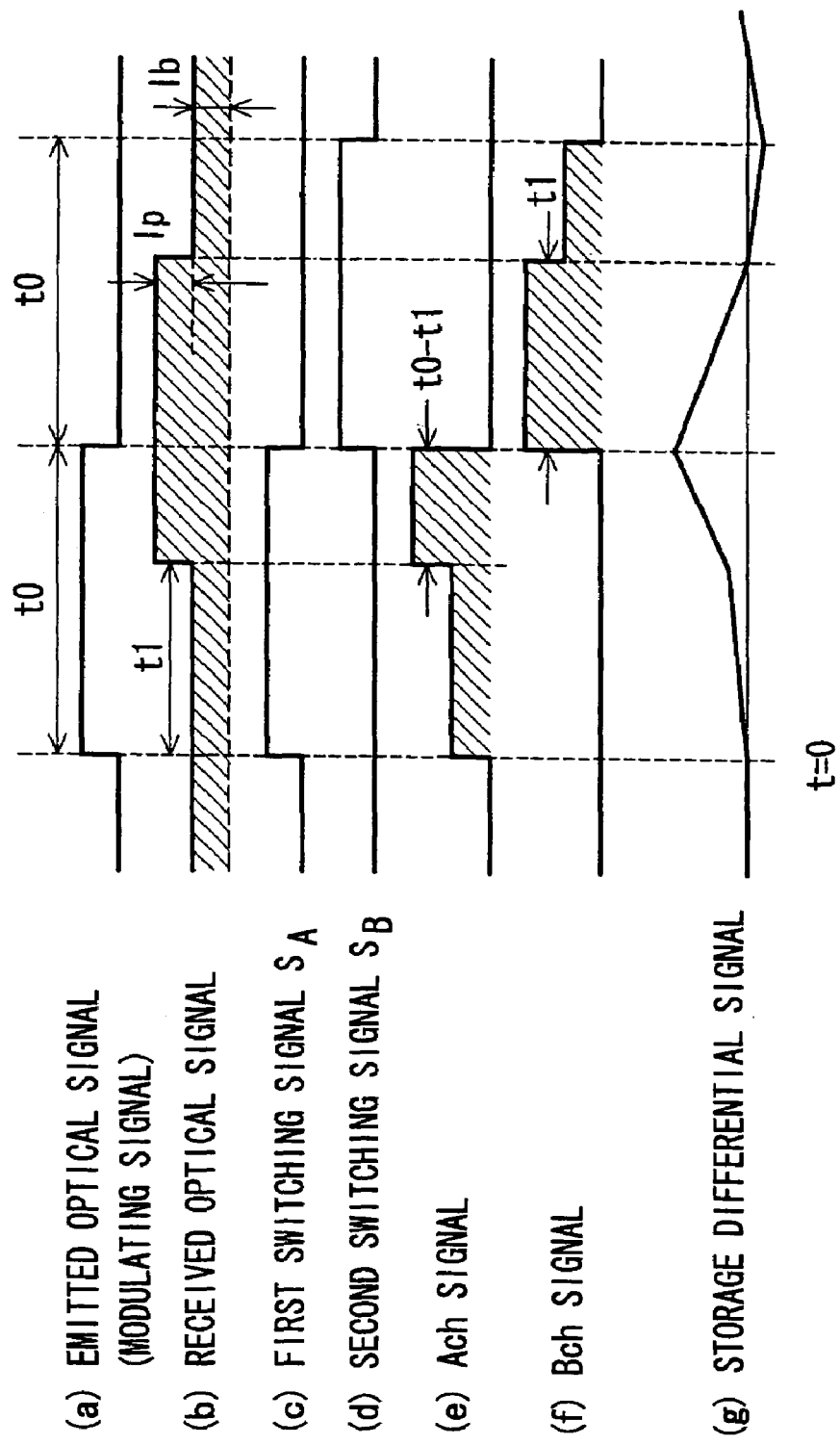
FIG. 13 is a timing chart depicting the operation of the optical distance measuring apparatus shown in FIG. 12.

FIG. 12 is a block diagram of an optical distance measuring apparatus of a ninth embodiment, and FIG. 13 is a timing chart depicting the operation of the optical distance measuring apparatus shown in FIG. 12. The optical distance measuring apparatus of this embodiment will be described below with reference to FIGS. 12 and 13.

This optical distance measuring apparatus is roughly constituted of, as shown in FIG. 12, a transmitter 211 for emitting an optical beam 217 toward an object to be measured 214, a receiver 212 for receiving an optical beam 218 reflected by the object 214, and a signal processing section 213 for processing a detected signal from the receiver 212.

In the transmitter 211, an optical beam 217 is emitted from a light-emitting device 216 toward the object 214 in synchronization with a modulating signal from a modulating signal generator 215. The modulating signal is, as shown in FIG. 13(a), a pulse wave in which a pulse having the pulse width of $t_0$ is repeated at a certain repetition frequency. However, the modulating signal is not limited to a pulse wave, and may be a triangular wave, a saw-tooth wave, or any other wave that can be expressed as a function of time such that the optical distance measuring apparatus functions properly. In the following description, the modulating signal is a pulse wave. Details of other modulating signals will be described later.

The optical beam 218 reflected by the object 214 is detected by a photodetector 219 of the receiver 212. At that time, the optical beam 218 is detected, as shown in FIG. 13(b), with a phase delay from the modulating signal by a time, $t_1$, necessary for the optical beam 217, 218 to travel the distance to the object 214 and back. "Ip" in FIG. 13(b) represents the intense of a reflected optical beam 18-based current signal (referred to as a pulse signal hereinafter) produced by photoelectric conversion of the photodetector 219, and "Ib" represents the intensity of a current signal (noise signal) based on the background light.

When the measurable distance range is 7.5 m, it is understood easily from Eq. (1) that the pulse width, t0, of the emitted optical signal is required to be 50 nsec. In addition, the background light is of the order of several dozen kHz at most, its cycle is thus of the order of several dozen μsec which is sufficiently larger than the pulse width of 50 nsec. For this reason, background light can be assumed to be DC light in the period of time of the pulse width t0 of the emitted optical signal as shown in FIG. 13.

After that, a channel for a detected signal (namely, received optical signal=pulse signal+noise signal) produced by the photodetector 219 is chosen between a first channel (Ach) and a second channel (Bch) by a first switch 220 and a second switch 221, and the received optical signal which has flowed from the photodetector 219 to the first channel (Ach) is input to a first storage section 222. On the other hand, the received signal which has flowed to the second channel is input to a second storage section 223. On-off control of the first switch 220 and the second switch 221 is performed with the same timing as the emitted optical signal as shown in FIGS. 13(c) and 13(d). In FIGS. 13(c) and 13(d), a first switching signal $S_A$ is a control signal for the first switch 220, and a second switching signal $S_B$ is a control signal for the second switch 221, which are supplied from the modulating signal generator 215 of the transmitter 211. Electric charges of (Ip(t0−t1) +Ib·t0) per one cycle of the modulating signal shown in FIG. 13(a) are stored in the first storage section 222 on the first channel (Ach), as shown in FIG. 13(e). Likewise, electric charges of (Ip·t1 +Ib·t0) per one cycle of the modulating signal shown in FIG. 13(a) are stored in the second storage section 223 on the second channel (Bch), as shown in FIG. 13(f).

Figure 17:
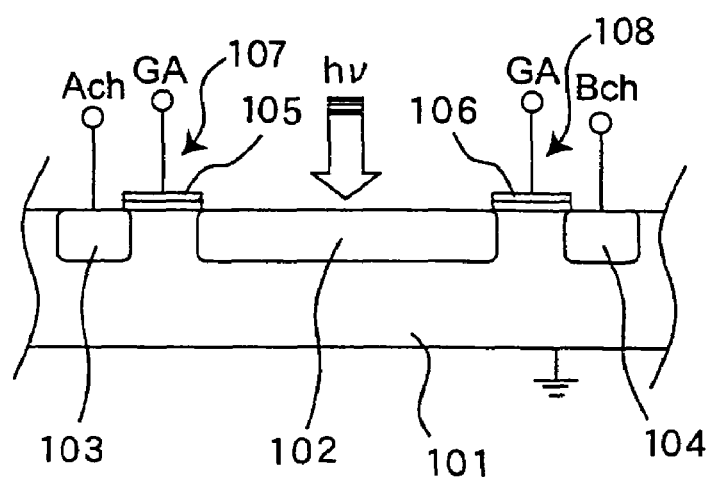
FIG. 17 is a schematic cross-sectional view showing an example of a photodetector having a photogate structure.
Figure 18:
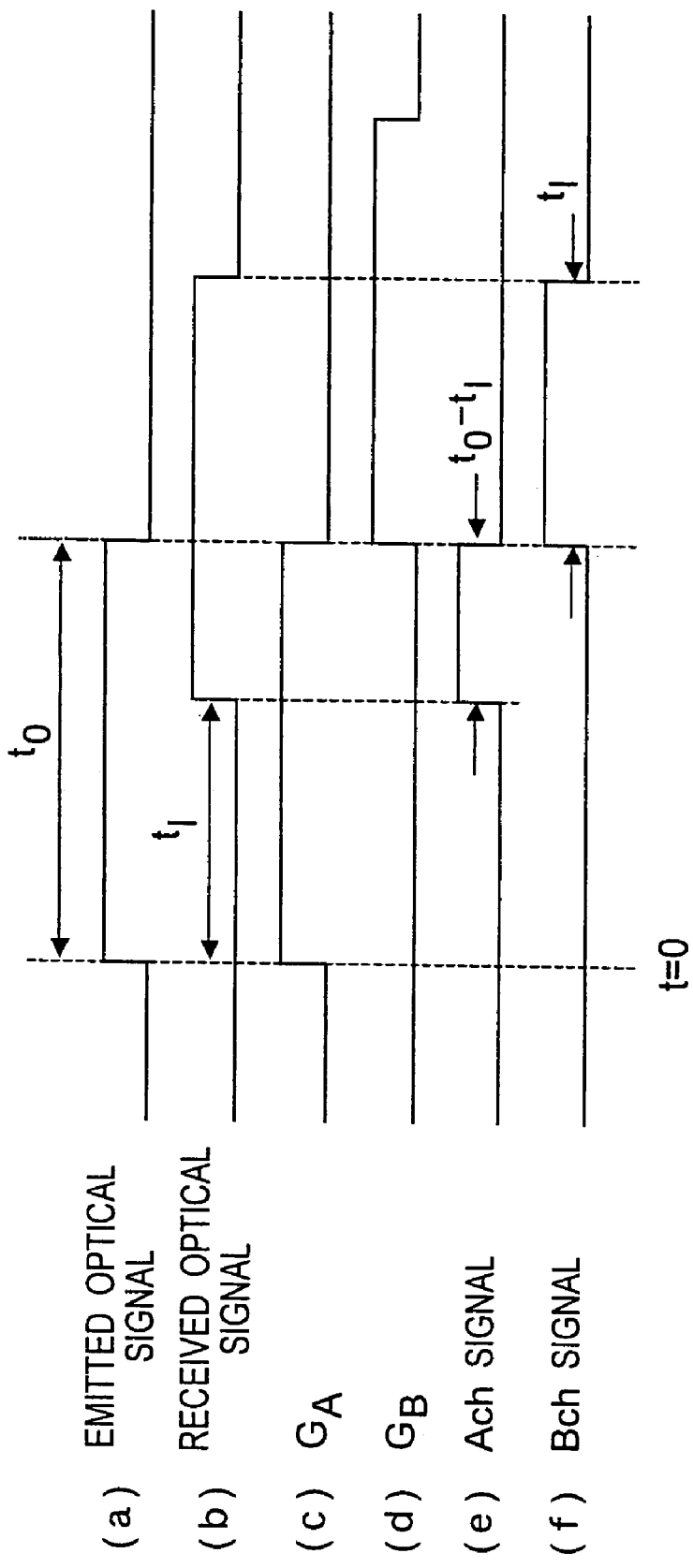
FIG. 18 is a timing chart depicting the operations of the photogates shown in FIG. 17.
Figure 19:
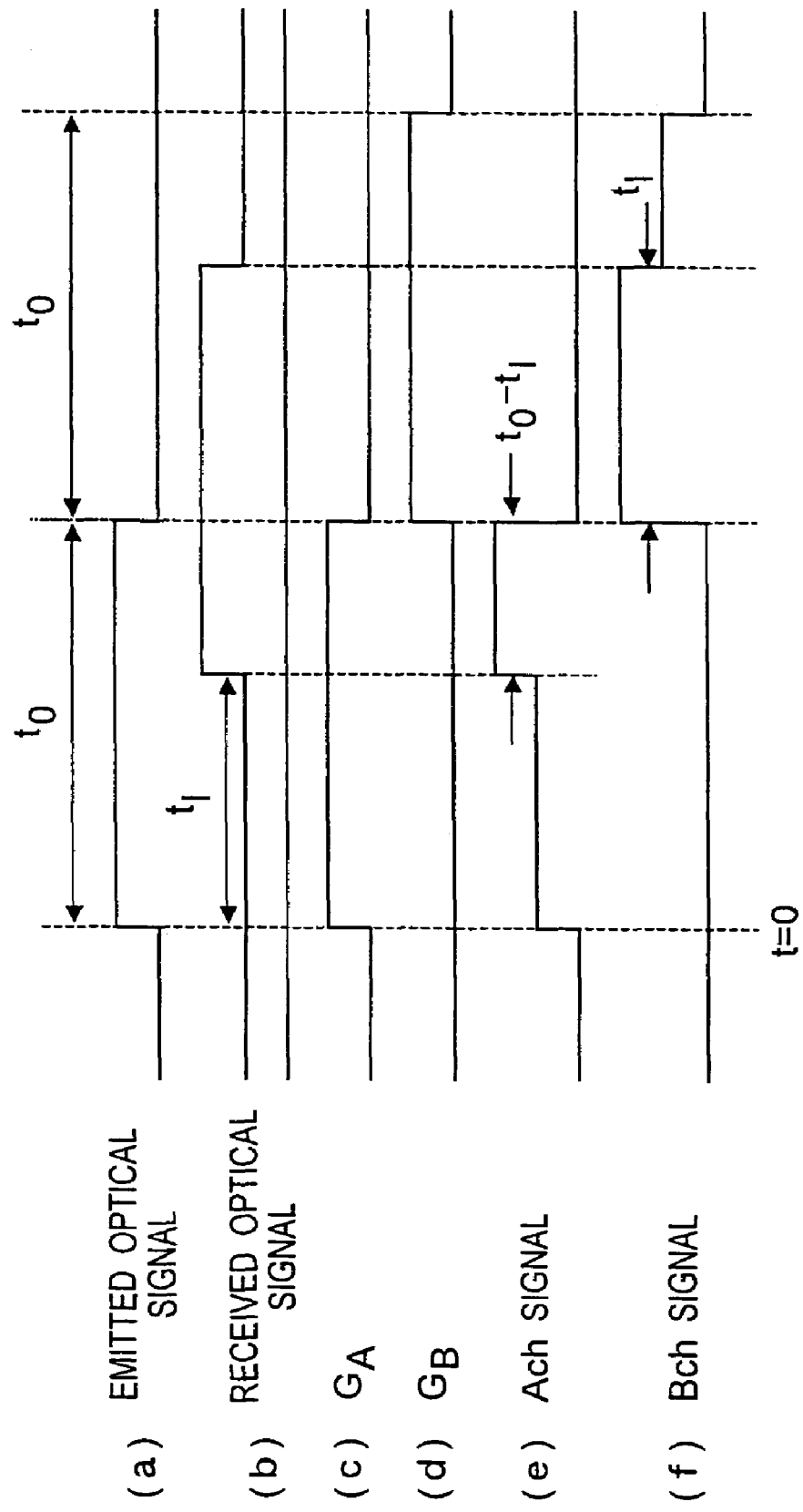
FIG. 19 is a timing chart in the case that there is background light in FIG. 18.

That is, the photodetector 219 of the receiver 212 corresponds, specifically, to the p-type semiconductor substrate 101 and the n-type semiconductor layer 102 in FIG. 17, the first switch 220 and the second switch 221 correspond to the MOS transistors 107 and 108 in FIG. 17, the first storage section 222 corresponds to the electric charge storage section 103 in FIG. 17, and the second storage section 223 corresponds to the electric charge storage section 104 in FIG. 17.

Electric charges stored in the first storage section 222 and electric charges stored in the second storage section 223 are input, as an Ach signal and a Bch signal, respectively, to a differential operation section 224 as an operation section of the signal processing section 213. The differential operation section 224 performs a calculation of a difference (differential operation) between the Ach signal from the first storage section 222 and the Bch signal from the second storage section 223. As a consequence, a storage differential signal as shown in FIG. 13(g) is obtained. The storage differential signal can be expressed by Eq. (17) using the number of storage operations N.

$$\text{Storage Differential Signal} = N \cdot [Ip(t0 - t1) + Ib \cdot t0] - \quad (17)$$
$$N \cdot (Ip \cdot t1 + Ib \cdot t0)$$
$$= N \cdot Ip(t0 - 2t1)$$

Figure 14:
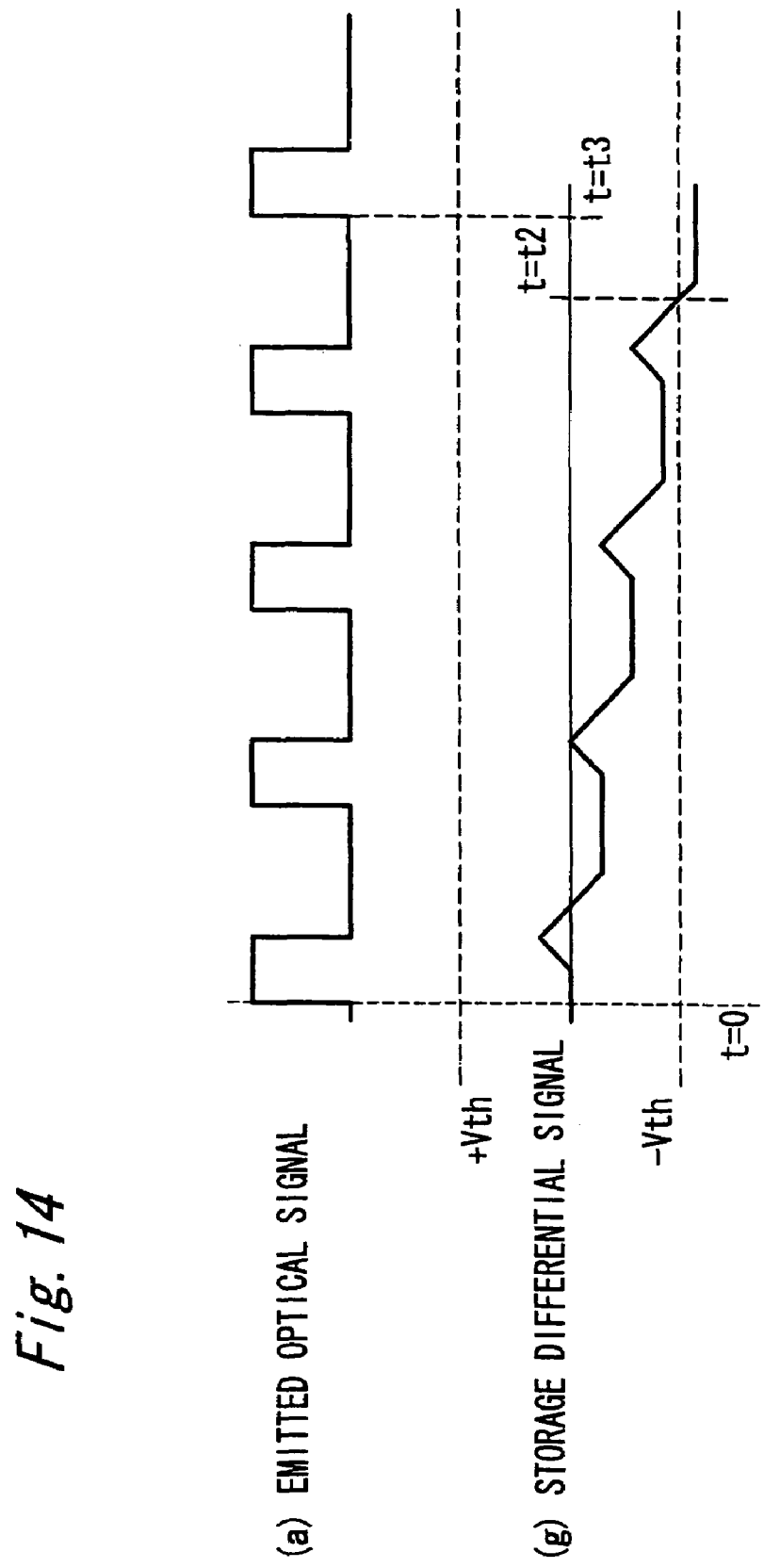
FIG. 14 shows the emitted optical signal shown in FIG. 13($a$) and the storage differential signal shown in FIG. 13($g$) over two or more cycles.

"N" in Eq. (17) will be decided as follows. FIG. 14 shows the emitted optical signal shown in FIG. 13(a) and the storage differential signal shown in FIG. 13(g) over a plurality of cycles. As shown in FIG. 14, the differential signal for the duration t0 of the emitted optical signal is integrated every cycle, and the level of the storage differential signal crosses a preset threshold −Vth at time t2. The number of integrations (i.e., number of cycles of the emitted optical signal) at that time is decided as the number of storage operations N. FIG. 14 shows, as an example, a case that the storage differential signal becomes negative, but whether the storage differential signal becomes positive or negative is dependent on the relation between the pulse width t0 and the delay time t1. However, in the case of t1=t0/2, the differential signal corresponding to the pulse width t0 becomes zero, so that even if the integration of the differential signal is repeated, the differential signal is not stored. In this case, any limitation such that the measurable range is limited to t0/2 is required.

For the purpose of detecting a time t2 when the value of the storage differential signal has reached the preset threshold (±Vth) as shown in FIG. 14, it is preferable to use a comparator which inverts its output level when the value of the storage differential signal has reached the threshold. In this embodiment, as shown in FIG. 12, the output signal from the differential operation section 224 is input to a comparator 225. The value of the storage differential signal is compared with the threshold (±Vth) by the comparator 225. When an absolute value of the storage differential signal has become larger than Vth (i.e., |value of storage differential signal|>Vth) and the level of the output signal from the comparator 225 has been inverted from "H" to "L", the level of the first switching signal $S_A$ and the level of the second switching signal $S_B$ are set to normally "L" by the output signal from the comparator 225 to stop the first switch 220 and the second switch 221 and then finish the measurement.

In this connection, a preferable time to finish the measurement by the output signal from the comparator 225 to the first switch 220 and the second switch 221 corresponds, as shown in FIG. 14, to a shortest cycle time of the modulating signal in which the time t2 required for the value of the storage differential signal to become the threshold is included. This is because the measurement is prevented from being finished while the first storage section 222 and the second storage section 223 are being charged with electric charge, and is allowed to be finished after the first storage section 222 and the second storage section 223 have been completely charged with electric charges.

The output signal (i.e., storage differential signal) from the differential operation section 224 is also input to a distance determining section 226. By the distance determining section 226, the number of storage operations N is obtained from the time t2 required for the value of the storage differential signal to reach the threshold, then, the time t1 required for the optical beam 217, 218 to travel to the object 14 and back is calculated using Eq. (17), and then the distance L to the object 214 is calculated using Eq. (1).

As described above, in this embodiment, a storage differential signal is obtained using Eq. (17) on the basis of the Ach signal from the first storage section 222 and the Bch signal from the second storage section 223 by the differential operation section 224. Like this, by performing a differential operation on the Ach signal and the Bch signal, noise components such as background light can be eliminated as appropriate, and thus only signal components necessary for calculating the distance to the object can be extracted and stored. Thus, by integrating the result of the differential operation a plurality of times, a sufficient amount of electric charges for the distance calculation can be stored in the differential. operation section 224.

Furthermore, because the number of integrations N used in obtaining the storage differential signal is determined based on the result of a comparison between the result of the storage differential operation and the preset threshold (±Vth), storing can be performed until a storage amount of only the signal components obtained after the noises such as the background light have been eliminated becomes sufficient to find the distance to the object 214. Consecuently, the first storage section 222 and the second storage section 223 are prevented from being saturated with noise components even under an environment such as the outdoors for example where background light is very strong, so that it is possible to detect the time required for the light to travel the distance to the object 214 and back from a sufficient amount of signal components, and thereby a high-precision distance operation can be performed.

The period of time, t1, required for the optical beam 17, 18 to travel to the object 214 and back can be calculated using Eq. (17) only when the intensity, Ip, of the received optical signal is known, more specifically, when using a measuring system in which the transmitter and the receiver are opposed to each other and a light-emitting device that emits coherent light, such as a laser, is used so that the light is directly received by the photodetector without dispersing the energy of the light. In such a case, the emitted energy and the received energy are equal, so that if the intensity Ip of the received optical signal is measured in advance, the period of time t1 between a time when laser is emitted from the light-emitting device and a time when the laser is received by the photodetector can be calculated using Eq. (17), and the distance L to the receiver can be calculated using Eq. (1) based on the obtained period of time t1.

Thus, only in such an exceptional case, the period of time t1 can be obtained using Eq. (17) only. However, in most of typical optical distance measuring apparatuses, the transmitter 211 and the receiver 212 are disposed in substantially the same position, and the reflected light from the object 214 is detected to measure a period of time t1 required for the light to travel the distance to the object 214 and back, and therefore the period of time t1 cannot be calculated only by using Eq. (17) because the intensity Ip of the received optical signal is unknown. However, it is needless to say that if the value of the intensity Ip of the received optical signal can be obtained in some way, the time t1 required for the round-trip can be calculated. In addition, as described above, there is a dead zone when t1=t0/2, so that it is necessary to place restrictions on the scope of application and the usage method.

Tenth Embodiment

The tenth embodiment relates to an optical distance measuring apparatus capable of measuring the distance to an object to be measured even if the intensity Ip of the received optical signal light based on the reflected light from the object is unknown. This optical distance measuring apparatus has two units each having a receiver and a differential operation Section, thereby being capable of measuring the distance to the object by detecting the reflected light from the object. This optical distance measuring apparatus will be described in detail below.

Figure 15:
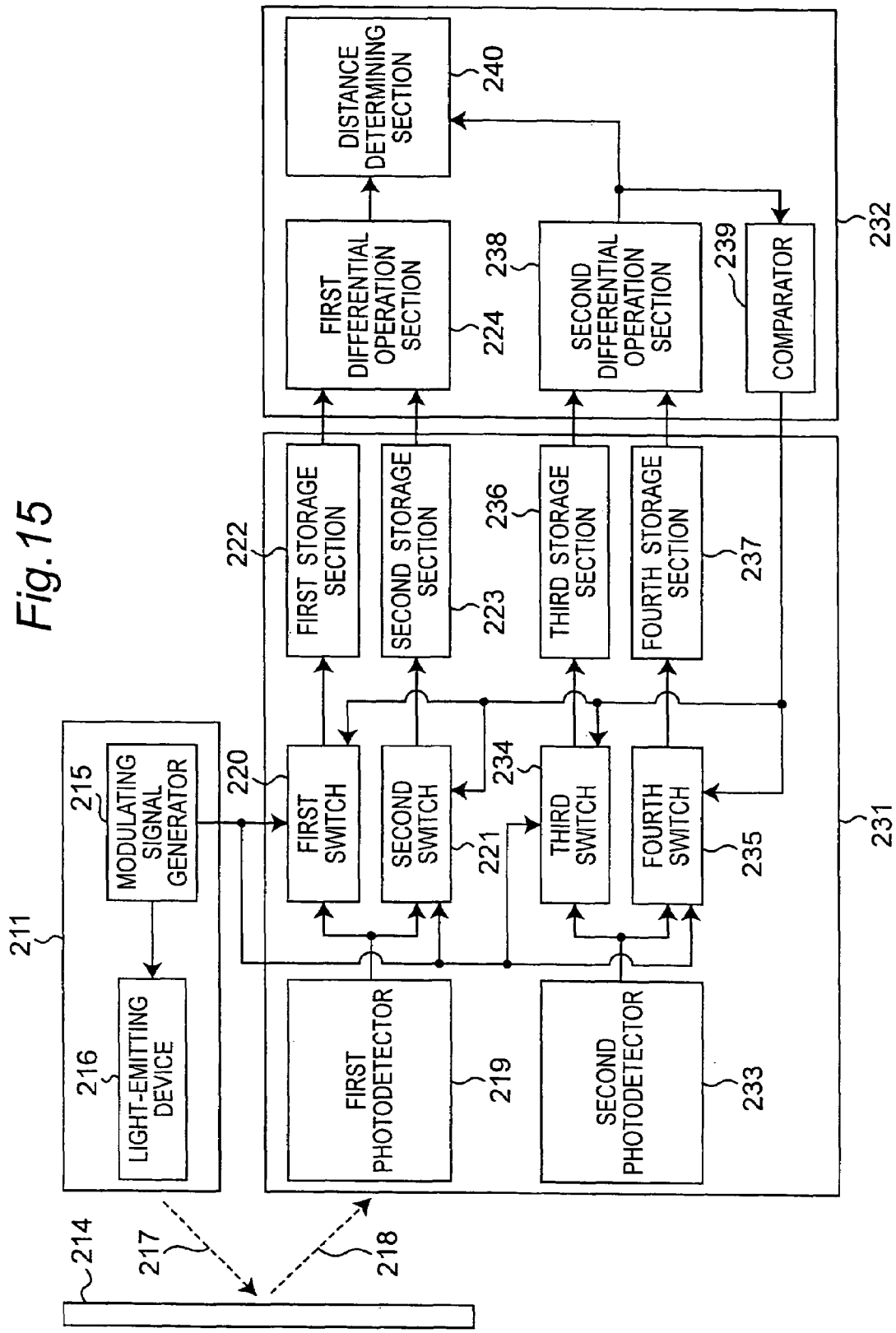
FIG. 15 is a block diagram of an optical distance measuring apparatus different from that in FIG. 12.
Figure 16:
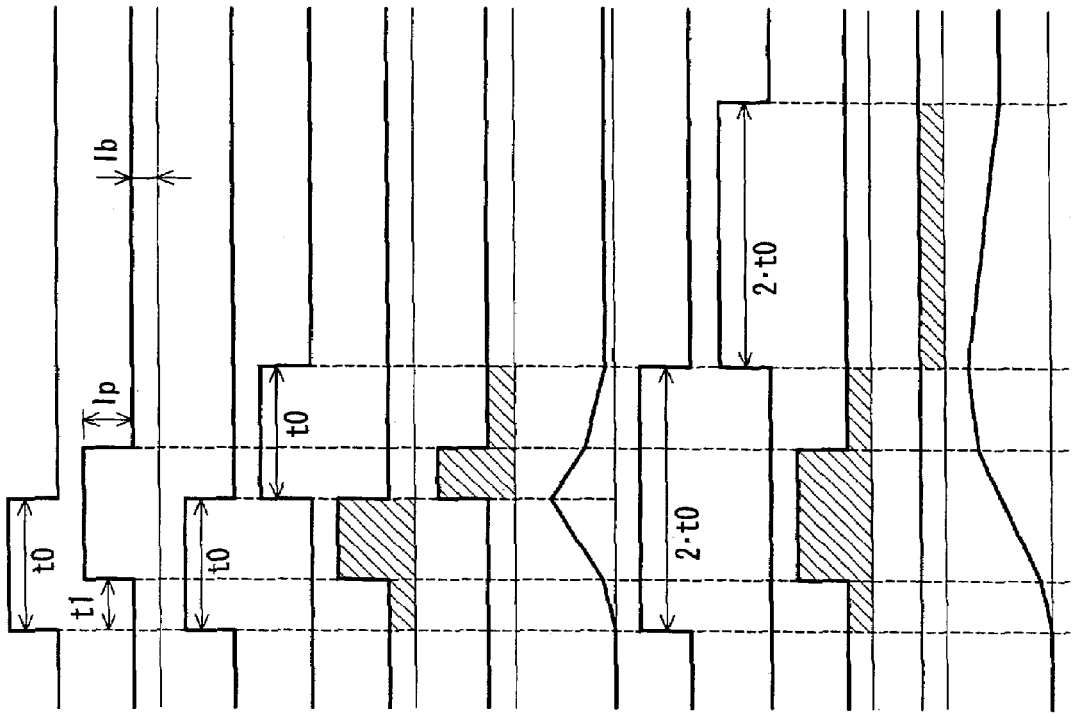
FIG. 16 is a timing chart depicting the operation of the optical distance measuring apparatus shown in FIG. 15.

FIG. 15 is a block diagram of the optical distance measuring apparatus of this embodiment, and FIG. 16 is a timing chart depicting the operation of the optical distance measuring apparatus shown in FIG. 15. The optical distance measuring apparatus of this embodiment will be described below with reference to FIGS. 15 and 16.

In FIG. 15, a transmitter 212, an object 214, a modulating signal generator 215, a light-emitting device 216, and an optical beam 217, 218 are the same as those of the optical distance measuring apparatus shown in FIG. 12 in the ninth embodiment, and description about them is omitted. Furthermore, a first photodetector 219, a first switch 220, a second switch 221, a first storage section 222 and the second storage section 223 that constitute a receiver 231 are the same as those of the optical distance measuring apparatus shown in FIG. 12, and description about them is omitted. A first differential operation section 224 constituting a part of a signal processing section 232 is the same as that of the optical distance measuring apparatus shown in FIG. 12, and description about it is omitted.

The first photodetector 219, the first switch 220, the second switch 221, the first storage section 222, the second storage section 223 and the first differential operation section 224 operate in accordance with the timing charts of FIGS. 16(a) to 16(g), similarly to the photodetector 219, the first switch 220, the second switch 221, the first storage section 222, the second storage section 223, and the differential operation section 224, respectively, of the ninth embodiment, for which the timing charts are shown in FIGS. 13(a) to 13(g). Thus, the first storage differential signal which is output from the first differential operation section 224 can be expressed using the number of storage operations $N_1$ [Eq. (18)] as in the case of Eq. (17) of the ninth embodiment.

$$\text{First Storage Differential Signal} = N_1 \cdot [Ip(t0 - t1) + Ib \cdot t0] - \quad (18)$$
$$N_1 \cdot (Ip \cdot t1 + Ib \cdot t0)$$
$$= N_1 \cdot Ip(t0 - 2t1)$$

As shown in FIG. 15, the receiver 231 further has a second photodetector 233, a third switch 234, a fourth switch 235, a third storage section 236, and a fourth storage section 237. The optical beam 218 reflected by the object 214 is detected by the second photodetector 233. A channel for a detected signal pruduced by the second photodetector 233 is alternately chosen between the third channel (Cch) and the fourth channel (Dch) by the third switch 234 and the fourth switch 235, on-off control of which is performed with the third switching signal $S_C$ and the fourth switching signal $S_D$ having a pulse width of 2t0 which are synchronized, as shown in FIGS. 16(h) and 16(i), with the emitted optical signal shown in FIG. 16(a).

The received optical signal which has flowed from the second photodetector 233 to the third channel (Cch) side is input to the third storage section 236. On the other hand, the received optical signal which has flowed from the second photodetector 233 to the fourth channel (Dch) is input to the fourth storage section 237. At this time, electric charges of (Ip·t0+Ib·2t0) are stored in the third storage section 236 on the third channel (Cch) as shown in FIG. 16(j). Likewise, electric charges of (Ib·2t0) are stored in the fourth storage section 237 on the fourth channel (Dch) as shown in FIG. 16(k).

That is, the receiver 231 in this embodiment specifically has a unit essentially consisting of a p-type semiconductor substrate and n-type semiconductor layer, MOS transistors, and electric charge storage sections, which correspond to the first photodetector 219, the first and second switches 220 and 221, and the first and second storage sections 222 and 223, respectively, and a unit essentially consisting of a p-type semiconductor substrate and n-type semiconductor layer, MOS transistors, and electric charge storage sections, which correspond to the second photodetector 233, the third and fourth switches 234 and 235, and the third and fourth storage sections 236 and 237, respectively, the units being provided in parallel in such a way that the optical beam 18 is able to come into the n-type semiconductor layers of the units at the same time.

Electric charges stored in the third storage section 236 and the fourth storage section 237 are input, as a Cch signal and a Dch signal, to the second differential operation section 238 of a signal processing section 232. The second differential operation section 238 performs a differential operation on a Cch signal from the third storage section 236 and a Dch signal from the fourth storage section 237. As a result, a second storage differential signal as shown in FIG. 16(l) is obtained. The second storage differential signal can be expressed by Eq. (19) using the number of storage operations $N_2$.

$$\text{Second Storage Differential Signal} = N_2 \cdot [Ip \cdot t0 + Ib \cdot 2t0] - \quad (19)$$
$$N_2 \cdot (Ib \cdot 2t0)$$
$$= N_2 \cdot Ip \cdot t0$$

As described above, in this embodiment, the switching time for the third switch 234 and the fourth switch 235 related to the third channel and the fourth channel is twice as long as the switching time for the first switch 220 and the second switch 221 related to the first channel and the second channel. As a result, the value of the second storage differential signal depends on the intensity Ip of the received optical signal because the pulse width t0 is known.

For this reason, in the ninth embodiment, as in the case of determining "N" of Eq. (17), the second differential signal corresponding to twice the duration t0 of the pulse signal is integrated every cycle of the emitted optical signal, and the number of integrations, i.e., the number of times of accumulation, at the time when the value of the second storage differential signal has reached a preset threshold is determined as the number of storage operations $N_2$ as described above.

In order to detect a period of time required for the value of the second storage differential signal to reach the preset threshold (in other words, the number of storage operations $N_2$), the output signal (second storage differential signal) from the second differential operation section 238 is input to the comparator 239 as in the case of the ninth embodiment. The value of the second storage differential signal is compared with the threshold by the comparator 239. When an absolute value of the second storage differential signal (i.e., |value of second storage differential signal|) has become larger than the threshold and the level of the output signal from the comparator 239 is inverted, the first switch 220, the second switch 221, the third switch 234, and the fourth switch 235 are stopped by the output signal from the comparator 239 and the measurement is finished.

As is apparent from Eq. (19), the second storage differential signal related to the third and fourth channels does not include any noise component such as background light, and the intensity Ip of the received optical signal itself is detected from the second storage differential signal, so that it is possible to store the received optical signal until the amount of the received optical signal becomes sufficiently large. Furthermore, the intensity of the received optical signal based on the reflected light from the object 214 is monitored with the second storage differential signal related to the third and fourth channels. For this reason, when the relation between the time t1 of delay of the received optical signal from the emitted optical signal and the pulse width t0 of the emitted optical signal is "t1=t0/2", even if the first storage differential signal related to the first channel and the second channel is "0", the distance to the object can be measured by suitable processing such as amplification of the second storage differential signal.

However, when the value of the second storage differential signal does not reach the threshold even if the result of the differential operation on a Cch signal and a Dch signal is stored for a certain period of time, it is assumed that the object 214 is too far to fall in the measurable distance range, or that the reflectivity of the object 214 is extremely low, or that the reflected light is extremely weak because of the surface state of the object. In these cases, it is judged that the measurement is impossible and storing of received optical signals is stopped. Thus, an inaccurate measurement result is prevented from being obtained.

Furthermore, when a value obtained by storage of the results of differential operations on the Cch signal and the Dch signal (in other words, the value of the second storage differential signal) has reached the threshold in a period of time shorter than another certain period of time which is shorter than the above certain period of time, it is assumed that the object 214 is too near to fall in the measurable distance range, or that the reflected light is too strong because the surface of the object 214 is like a mirror surface. In these cases, the number of storage operations $N_1$ and the number of storage operations $N_2$ in Eqs.(18) and (19), respectively, become small, so that the measurement accuracy per measurement has a large influence on the measurement result, with the result that a sufficient averaging effect cannot be obtained, which will eventually lead to a reduction in measurement accuracy. In order to prevent this, it may preferably be judged that the measurement is impossible also when the value of the second storage differential signal has reached the threshold within the above certain period of time.

The output signal (first storage differential signal) from the first differential operation section 224 and the output signal (second storage differential signal) from the second differential operation section 238 are input to the distance determining section 240. By the distance determining section 240, the ratio between the first storage differential signal S1 and the second differential signal S2 is calculated, and the distance L to the object 214 is obtained using the ratio according to the following Eq. (20).

$$L = \frac{c}{2} \cdot t1 \qquad (20)$$
$$= \frac{c}{2} \cdot \frac{t0}{2} \cdot \left(1 - \frac{S1}{S2}\right) = \frac{c \cdot t0}{4} \cdot \left(1 - \frac{S1}{S2}\right)$$

As described above, in this embodiment, the receiver 231 is provided with the second photodetector 233, the third switch 234, the fourth switch 235, the third storage section 236, and the fourth storage section 237 in addition to the first photodetector 219, the first switch 220, the second switch 221, the first storage section 222, and the second storage section which are the same as those in the ninth embodiment. Furthermore, the signal processing section 232 is provided with the second differential operation section 238 in addition to the first differential operation section 224 which is the same as that of the ninth embodiment.

Differential operations for the Ach signal and the Bch signal are performed by the first photodetector 219, the first switch 220, the second switch 221, the first storage section 222, the second storage section 223, and the first differential operation section 224 as in the case of the ninth embodiment, whereby the first storage differential signal which does not include noise components such as background light, as indicated by Eq. (18), is obtained. Furthermore, by the second photodetector 233, the third switch 234, the fourth switch 235, the third storage section 236, the fourth storage section 237, and the second differential operation section 238, the second storage differential signal is obtained which is a signal obtained by storage of the results of differential operations on the Cch signal and the Dch signal, as indicated by Eq. (19).

At that time, the switching time for the third switch 234 and the fourth switch 235 is set to twice as long as the pulse width t0 of the emitted optical signal. Thus, the Cch signal and the Dch signal include the whole of the pulse signal based on the optical beam 218 of the reflected light, so that the second storage differential signal based on only the intensity Ip of the received optical signal can be obtained by performing differential operation on the Cch signal and the Dch signal. As a result, the distance L to the object 214 can be obtained using Eq. (20) on the basis of the first storage differential signal and the second storage differential signal by the distance determining section 240.

Thus, according to this embodiment, even if the intensity Ip of the received optical signal is unknown, the distance L to the object 214 can be measured accurately even under an environment that background light is strong.

Furthermore, the number of integrations to obtain the first storage differential signal and the second storage differential signal is decided by the result of comparison between the result of the second storage differential operation and a preset threshold. For this reason, even if the relation between the time of delay of the received optical signal from the emitted optical signal and the pulse width t0 of the emitted optical signal is "t1=t0/2" and the first storage differential signal is "0", it is possible to measure the distance to the object 214. In addition, the intensity Ip of the received optical signal itself is detected based on the second storage differential signal, so that differential signals can be stored until the amount of received optical signals becomes sufficiently large.

Furthermore, in the tenth embodiment, the switching time for the third switch 234 and the fourth switch 235 is set to twice as long as the pulse width t0 of the emitted optical signal. In the present invention, however, the switching time is not limited to twice the pulse width t01, but may be longer.

If the switching time is twice or more as long as the pulse width t0, the whole of the pulse signal based on the optical beam 218 of the reflected light is included in the Cch signal and the Dch signal, thus providing a similar effect. However, when the switching time for the third switch 234 and fourth switch 235 is longer than twice the pulse width t0, it only results that the amount of stored electric charges related to the noise components such as the background light increases. Consequently, the switching time for the third switch 234 and the fourth switch 235 is most preferably twice as long as the pulse width t0 of the emitted optical signal.

Furthermore, in the tenth embodiment, two units each having a receiver and a differential operation section are provided. One of the two units includes the first switch 220 and second switch 221 whose on-off control is performed with the switching signals shown in FIGS. 16(*c*) and 16(*d*), and the other of the two units includes the third switch 234 and fourth switch 235 whose on-off control is performed with the switching signals shown in FIGS. 16(*h*) and 16(*i*). However, the optical distance measuring apparatus shown in FIG. 12 that has only one unit having a receiver and a differential operation section is also able to carry out an operation similar to the operation according to the timing chart shown in FIG. 16.

In such a case, in the configuration shown in FIG. 12, there may be provided a control section which receives an output signal of the comparator 225, and changes, when the level of the output signal is inverted from "H" to "L", the cycles of the switching signals supplied to the first switch 220 and the second switch 221 to change the timing of switching between the channels and to erase the electric charges stored in the first storage section 222 and the second storage section 223.

The control section first controls the modulating signal generator 215 to output the switching signals shown in FIGS. 16(*h*) and 16(*i*) in order to turn on and off the first switch 220 and the second switch 221 with timings shown in FIGS. 16(*h*) and 16(*i*). At that time, the differential operation section 224 operates like the second differential operation section 238 shown in FIG. 15 to output the second storage differential signal expressed by Eq. (19). As a consequence, processing in a first time period is carried out. When |value of second storage differential signal| has become more than Vth, the comparator 225 inverts the level of its output signal from "H" to "L".

The control section then erases the electric charges stored in the first storage section 222 and the second storage section 223, and decides the length of a second time period subsequent to the first time period on the basis of the storage time (i.e., number of storage operations N2) in the first time period obtained from the value of the second storage differential signal and the threshold Vth. Furthermore, the control section controls the modulating signal generator 215 to output the switching signals shown in FIGS. 16(*c*) and 16(*d*) in order to turn on and off the first switch 220 and the second switch 221 only for the above decided time length with the timings shown in FIGS. 16(*c*) and 16(*d*). At that time, the differential operation section 224 operates like the first differential operation section 224 shown in FIG. 15 to output the first storage differential signal expressed by Eq. (18). In this manner, processing in the second time period is carried out.

When the processing in the second time period has finished, the distance determining section 226 calculates the ratio between the first storage differential signal S1 and the second storage differential signal S2, and obtain the distance, L, to the object 214 using the ratio according to Eq. (20).

In this case, the same effect as that of the tenth embodiment, such as that the distance to the object 214 can be measured accurately even if background light is strong and the intensity Ip of the received optical signal is unknown, can be achieved by an optical distance measuring apparatus having only one unit consisting of a receiver and a differential operation section described above. Thus, the same function as that of the optical distance measuring apparatus having the two units in the tenth embodiment can be achieved by a more compact optical distance measuring apparatus.

Furthermore, in each of the ninth and tenth embodiments, a pulse wave is used as the modulating signal applied to the light-emitting device. When the modulating signal is a pulse wave, the received optical signal is also a pulse wave, and the received optical signal obtained when the reflected signal light is received has a strength which is maintained at a constant value. As a result, the amounts of stored electric charges related to the Ach to Dch signals vary in proportion to the distance L to the object 214, so that for each of the Ach to Dch signals, linearity is provided between the amount of stored electric charge and the distance L over the full distance-measurable range. For this reason, the resolution can be constant over the full distance-measuring range.

In contrast to this, when a triangular wave or a sawtooth wave is used as the modulating signal, the waveform of the received optical signal is a linear function of time, and the amounts of stored electric charges related to the Ach to Dch signals become quadratic functions of time. As a result, roughness and fineness are produced in the resolution over the distance measuring range. For this reason, whether a pulse wave or a triangular or sawtooth wave is used as the modulating signal should be preferably determined as appropriate in accordance with applications.

Example embodiments having been thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical distance measuring apparatus for measuring a transit time of light between a time when the light is emitted and a time when the light reflected by an object to be measured is received, to detect a distance to the object, comprising:
    a light-emitting device for emitting an optical signal which is synchronized with a modulating signal having a predetermined repetition frequency;
    a photodetector for receiving the optical signal from the light-emitting device reflected by the object and converting the optical signal to an electrical signal;
    a switch for alternately choosing at least two channels for the electrical signal from the photodetector with a predetermined timing;
    a storage/differential operation section for storing electrical signals on the channels alternately chosen by the switch and performing a differential operation on the stored electrical signals; and
    a distance determining section for determining the distance to the object on the basis of a result of the differential operation of the storage/differential operation section.

2. An optical distance measuring apparatus as claimed in claim 1, wherein:
    the storage/differential operation section comprises an integrator having a capacitive element; and
    the electrical signal is stored by the integrator.

3. An optical distance measuring apparatus as claimed in claim 2, wherein:
    a first channel and a second channel are chosen alternately by the switch;
    the integrator of the storage/differential operation section comprises a first integrator connected with the first channel and a second integrator connected with the second channel; and the storage/differential operation section performs a differential operation on an output of the first integrator and an output of the second integrator.

4. An optical distance measuring apparatus as claimed in claim 3, wherein capacitance values of the capacitive elements in the first and second integrators are equal or generally equal to each other.

5. An optical distance measuring apparatus as claimed in claim 3, wherein at least the photodetector, the first integrator, and the second integrator are made on one semiconductor substrate.

6. An optical distance measuring apparatus as claimed in claim 1, wherein the storage/differential operation section comprises an integrator having a capacitive element, and performs a differential operation while storing the electrical signal by the integrator.

7. An optical distance measuring apparatus as claimed in claim 1, wherein a differential operation is performed by alternately choosing the channels for an photoelectric current detected by the photodetector and reversing a direction in which the photoelectric current to be input to an input terminal of the integrator flows.

8. An optical distance measuring apparatus as claimed in claim 7, wherein:
the photodetector comprises a first photodetector whose cathode is connected with a power supply, and a second photodetector whose anode is connected with a reference potential; and
the switch connects the anode of the first photodetector to the input terminal of the integrator of the storage/differential operation section while connecting the cathode of the second photodetector to the input terminal of the integrator of the storage/differential operation section, with predetermined timing.

9. An optical distance measuring apparatus as claimed in claim 8, wherein the first photodetector and the second photodetector are equal in structure and size.

10. An optical distance measuring apparatus as claimed in claim 8, wherein at least the first photodetector and the second photodetector are made on one semiconductor substrate.

11. An optical distance measuring apparatus as claimed in claim 7, further comprising:
a current-discharging first mirror circuit for producing two currents equal in magnitude to a current flowing into the photodetector; and
a current-absorbing second current mirror circuit to which one of the two currents produced by the first current mirror circuit is input, and which produces a current equal in magnitude to the one of the two currents,
wherein the switch is operated in such a manner that inputting the other of the two currents produced by the first mirror circuit to the input terminal of the integrator and inputting the current produced by the second mirror circuit to the input terminal of the integrator are carried out alternately with the predetermined timing.

12. An optical distance measuring apparatus as claimed in claim 7, further comprising:
a constant current source;
a current-discharging first current mirror circuit for producing two currents equal in magnitude to a current flowing through the constant current source; and
a current-absorbing second current mirror circuit for producing two currents equal in magnitude to the current flowing through the constant current source,
wherein an anode of the photodetector is connected with one of output-side terminals of the first current mirror circuit, and a cathode of the first photodetector is connected with the other of the output-side terminals of the first current mirror circuit; and
wherein the switch is operated in such a manner that connecting one of the output-side terminals of the first current mirror circuit to the input terminal of the integrator while connecting the other of the output-side terminals of the first current mirror circuit to a resistive load, and connecting the other of the output-side terminals of the first current mirror circuit to the input terminal of the integrator while connecting the one of the output-side terminals of the first current mirror circuit to the resistive load are carried out alternately with the predetermined timing.

13. An optical distance measuring apparatus as claimed in claim 1, wherein:
the switch comprises a first switch and a second switch;
the storage/differential operation section comprises a first storage section and a second storage section;
the photodetector is disposed adjacent to the first switch and the second switch;
the first storage section is disposed adjacent to the first switch;
the second storage section is disposed adjacent to the second switch;
the storage/differential operation section performs a differential operation on signals stored in the first storage section and the second storage section; and
at least the photodetector, the first switch, the second switch, the first storage section, and the second storage section are made on one semiconductor substrate.

14. An optical distance measuring apparatus as claimed in claim 13, wherein the photodetector, the first switch, the second switch, the first storage section, and the second storage section are bilaterally symmetric with respect to a center line of the photodetector.

15. An optical distance measuring apparatus as claimed in claim 1, comprising two units each having the photodetector, the switch, and the storage/differential operation section.

16. An optical distance measuring apparatus as claimed in claim 15, wherein:
the two units are a first unit and a second unit; and
the distance determining section calculates a ratio between an output of the first unit and an output of the second unit, and determines the distance to the object on the basis of the ratio.

17. An optical distance measuring apparatus as claimed in claim 16, wherein:
the first unit and the second unit have same switching times, and
the modulating signal includes a sinusoidal wave signal.

18. An optical distance measuring apparatus as claimed in claim 15, wherein:
the two units are a first unit and a second unit; and
when the first unit has a switching time of T, the second unit has a switching time of 2T or more.

19. An optical distance measuring apparatus as claimed in claim 18, wherein a switching signal for driving the switch varies between a first storage time period during which the switching signal drives the switch for the switching time of T and a second storage time period during which the switching signal drives the switch for the switching time of 2T or more.

20. An optical distance measuring apparatus as claimed in claim 18, wherein the modulating signal is a pulse wave.

21. An optical distance measuring apparatus as claimed in claim 15, wherein:
the two units are a first unit and a second unit;
the storage/differential operation section of the first unit and the storage/differential operation section of the second unit each comprise an integrator having a capacitive element; and the capacitive elements in the integrators of the storage/ differential operation sections of the first and second units have generally equal capacitance values.

22. An optical distance measuring apparatus as claimed in claim 15, wherein:
the two units are a first unit and a second unit; and
the first unit and the second unit are made on one semiconductor substrate.

23. An optical distance measuring apparatus as claimed in claim 1, wherein the light-emitting device is a light-emitting diode.

24. An optical distance measuring apparatus as claimed in claim 1, wherein the light-emitting device is a laser diode.

25. An optical distance measuring apparatus as claimed in claim 1, further comprising a scanning mechanism for scanning with an optical beam emitted from the light-emitting device.

26. An optical distance measuring apparatus comprising:
a transmitter for transmitting light in synchronization with a modulating signal having a repetition frequency;
a receiver for receiving light which has been transmitted from the transmitter and reflected by an object to be measured, and outputting a signal corresponding to the received optical signal; and
a signal processing section for processing the signal output from the receiver,
the receiver comprising:
a photodetector for converting a received optical signal to an electrical signal;
a switch for alternating choosing at least two channels for the electrical signal from the photodetector with a predetermined timing which is synchronized with the modulating signal; and
a plurality of storage sections which are each disposed on one of the channels and stores electrical signals on the channels alternately chosen by the switch,
the signal processing section comprising:
an operation section for performing a differential operation on electrical signals stored in the storage sections on the channels alternately chosen by the switch;
a storage time determining section for determining a storage time of the storage sections on the basis of a result of the differential operation by the operation section; and
a distance determining section for determining a distance to the object using the result of the differential operation performed by the operation section on electrical signals stored in the storage sections for the storage time determined by the storage time determining section.

27. An optical distance measuring apparatus as claimed in claim 26, wherein the storage time determining section determines the storage time by comparing the result of the differential operation by the operation section with a threshold.

28. An optical distance measuring apparatus as claimed in claim 27, wherein the storage time determining section determines the storage time such that the storage time satisfies the following relationship:

$$T\text{sum} = m \times T$$

where Tsum is the storage time, T is the repetition frequency of the modulating signal, and m is a minimum integer which satisfies m>t/T, where t is a time required for the result of the differential operation by the operation section to reach the threshold.

29. An optical distance measuring apparatus as claimed in claim 27, wherein:

the receiver and the signal processing section comprise two units each having the photodetector, the switch, the storage sections, and the operation section;
a switching interval of the switch in a first unit which is one of the two units is twice or more as long as a switching interval of the switch in a second unit which is the other of the two units;
the storage time determining section determines a storage time for the storage sections of the first unit and a storage time for the storage sections of the second unit by comparing the result of the differential operation by the operation section of the first unit with a threshold; and
the distance determining section determines the distance to the object using the result of the differential operation by the operation section of the first unit and the result of the differential operation by the operation section of the second unit.

30. An optical distance measuring apparatus as claimed in claim 29, wherein the storage time for the storage sections of the first unit and the storage time for the storage sections of the second unit are equal.

31. An optical distance measuring apparatus as claimed in claim 26, further comprising a control section for controlling the timing of choosing the channels alternately by the switch and for erasing the electrical signals stored in the storage sections, wherein
the control section makes the switch to choose the channels alternately with a first timing, and when the storage time for the storage sections has been determined by the storage time determining section, the control section erases the electrical signals stored in the storage sections and then makes the switch to choose the channels alternately with a second timing to store electrical signals corresponding to the determined storage time in the storage sections; and
the distance determining section determines the distance to the object using the result of the differential operation performed by the operation section when the channels have been chosen alternately by the switch with the first timing, and the result of the differential operation performed by the operation section when the channels have been chosen alternately by the switch with the second timing.

32. An optical distance measuring apparatus as claimed in claim 27, wherein:
when the result of the differential operation by the operation section has not reached the threshold within a first predetermined time, the storage time determining section determines that it is impossible to determine the storage time; and
when the storage time determining section has determined that it is impossible to determine the storage time, the distance determining section determines that it is impossible to determine the distance to the object.

33. An optical distance measuring apparatus as claimed in claim 27, wherein:
when the result of the differential operation by the operation section has reached the threshold within a second predetermined time that is shorter than the first predetermined time, the storage time determining section determines that it is impossible to determine the storage time; and
when the storage time determining section determines that it is impossible to determine the storage time, the distance determining section determines that it is impossible to determine the distance to the object.

* * * * *